US010635317B2

(12) United States Patent
Kim et al.

(10) Patent No.: US 10,635,317 B2
(45) Date of Patent: Apr. 28, 2020

(54) OPERATION METHOD OF STORAGE SYSTEM AND HOST

(71) Applicant: SAMSUNG ELECTRONICS CO., LTD., Suwon-si, Gyeonggi-Do (KR)

(72) Inventors: Dong-Min Kim, Hwaseong-si (KR); Byungjune Song, Suwon-si (KR); Songho Yoon, Yongin-si (KR); Jeong-Woo Park, Hwaseong-si (KR); Jaegyu Lee, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 86 days.

(21) Appl. No.: 15/498,585

(22) Filed: Apr. 27, 2017

(65) Prior Publication Data
US 2018/0046371 A1   Feb. 15, 2018

(30) Foreign Application Priority Data

Aug. 9, 2016   (KR) .......................... 10-2016-0101442

(51) Int. Cl.
*G06F 3/06*       (2006.01)
*G06F 13/16*      (2006.01)
*G06F 9/4401*     (2018.01)

(52) U.S. Cl.
CPC ............ *G06F 3/061* (2013.01); *G06F 3/0656* (2013.01); *G06F 3/0659* (2013.01); *G06F 3/0679* (2013.01); *G06F 13/1663* (2013.01); *G06F 9/4418* (2013.01)

(58) Field of Classification Search
CPC ...... G06F 3/061; G06F 3/0656; G06F 3/0659; G06F 3/0679; G06F 13/1663; G06F 9/4418
See application file for complete search history.

(56) References Cited

U.S. PATENT DOCUMENTS

| 4,430,702 | A | * | 2/1984 | Schiebe | ................. G06F 12/14 709/220 |
| 5,136,582 | A | * | 8/1992 | Firoozmand | .......... H04L 47/521 370/400 |
| 5,287,478 | A | * | 2/1994 | Johnston | ................ G06F 3/0601 360/48 |
| 5,317,692 | A | * | 5/1994 | Ashton | .................... G06F 13/28 711/167 |
| 5,367,643 | A | * | 11/1994 | Chang | ...................... G06F 5/06 370/412 |

(Continued)

OTHER PUBLICATIONS

NPL_UFSA_Introduction to the Universal Flash Storage Assocation; White Paper (Year: 2013).*

(Continued)

*Primary Examiner* — Paul M Knight
(74) *Attorney, Agent, or Firm* — Volentine, Whitt & Francos, PLLC

(57) ABSTRACT

A storage system shares a system memory of a host. An operation method of the storage system may include receiving a command including information about a shared memory from the host, receiving a stream command having no timeout from the host, and transmitting a first packet associated with the stream command to the host in response to the received stream command. The first packet includes information for accessing the shared memory.

13 Claims, 17 Drawing Sheets

(56) References Cited

U.S. PATENT DOCUMENTS

| | | | | |
|---|---|---|---|---|
| 5,608,720 | A | * | 3/1997 | Biegel .................... H04J 3/1611 370/249 |
| 5,966,546 | A | * | 10/1999 | Thomas ................ G06F 13/387 709/250 |
| 6,341,315 | B1 | * | 1/2002 | Arroyo ................... H04L 49/90 709/200 |
| 7,853,735 | B2 | | 12/2010 | Jin et al. |
| 7,908,435 | B2 | | 3/2011 | Allen |
| 8,583,853 | B1 | * | 11/2013 | Lee ....................... G06F 3/0604 711/100 |
| 8,918,600 | B2 | | 12/2014 | Galbo et al. |
| 2005/0033911 | A1 | * | 2/2005 | Kitamura .............. G06F 3/0607 711/111 |
| 2006/0129373 | A1 | * | 6/2006 | Georgis ............... G11B 27/002 703/24 |
| 2008/0232286 | A1 | * | 9/2008 | Habetha ............ H04W 52/0216 370/311 |
| 2009/0063721 | A1 | * | 3/2009 | Uno .................. G06F 17/30218 710/14 |
| 2010/0106886 | A1 | * | 4/2010 | Marcu ................... G06F 1/3225 711/102 |
| 2011/0241432 | A1 | * | 10/2011 | Nishioka ............. H04L 25/0272 307/80 |
| 2013/0191592 | A1 | * | 7/2013 | Li ........................... G06F 12/08 711/114 |
| 2014/0095665 | A1 | * | 4/2014 | Mathur ............ H04N 21/44008 709/219 |
| 2015/0074334 | A1 | | 3/2015 | Kondo et al. |
| 2015/0106573 | A1 | | 4/2015 | Yi |
| 2015/0134889 | A1 | | 5/2015 | Zhong et al. |
| 2015/0160711 | A1 | * | 6/2015 | Zhu ................... H04W 52/0254 713/323 |
| 2016/0011964 | A1 | | 1/2016 | Rostoker et al. |

OTHER PUBLICATIONS

NPL_ELEC464: Microcomputer System Design 1996/97 Winter Session Term 1 The SCSI Interface; UBC (Year: 1996) at http://www.ece.ubc.ca/~edc/464/lectures/lec16.pdf.*

EECE 379 : Design of Digital and Microcomputer Systems 2000/2001 Winter Session, Term 1 DMA, System Buses and Peripheral Buses; UBC (Year: 2000) at http://www.ece.ubc.ca/~edc/379/lectures/lec6.pdf.*

NPL_EE362: Memory to Memory DMA operation; Purdue University (Year: 2010).*

Preventing Session Table Explosion in Packet Inspection Computers by Kim (Year: 2005).*

Introduction to direct memory access by Stuart Ball (Year: 2013).*

Linux Device Drivers, Direct Memory Access by Corbet (Year: 2005).*

New Techniques to Curtail the Tail Latency in Stream Processing Systems by Du, U of Illinois (Year: 2016).*

Direct Memory Access (DMA) and Interrupt Handling by EventHelix (Year: 2015).*

DMA Fundamentals on Various PC Platforms by A. F. Harvey, National Instruments (Year: 1991).*

Retransmission Schemes for Streaming Internet Multimedia: Evaluation Model and Performance Analysis by Loguinov (Year: 2002).*

Motorola DSP56300 Family Manual Chapter 10 DMA Controller (Year: 2015).*

* cited by examiner

OPERATION METHOD OF STORAGE SYSTEM AND HOST

CROSS-REFERENCE TO RELATED APPLICATIONS

This U.S. non-provisional patent application claims priority under 35 U.S.C. § 119 of Korean Patent Application No. 10-2016-0101442, filed on Aug. 9, 2016, the entire contents of which are hereby incorporated by reference.

BACKGROUND

The disclosure relates to semiconductor memory devices, and more particularly, to a method of operating a storage system and a method of operating a host.

A semiconductor memory device may be classified into a volatile memory device that loses its stored data when its power supply is interrupted and a nonvolatile memory device that retains its stored data even when its power supply is interrupted. Examples of the volatile memory device include an SRAM (static RAM), a DRAM (dynamic RAM), an SDRAM (synchronous DRAM), etc. Examples of the nonvolatile memory device include a ROM (read only memory), a PROM (programmable ROM), an EPROM (electrically programmable ROM), an EEPROM (electrically erasable and programmable ROM), a flash memory, a PRAM (phase change RAM), an MRAM (magnetic RAM), an RRAM (resistive RAM), an FRAM (ferroelectric RAM), etc.

A flash memory device is widely used as a high-capacity storage medium. Due to a speed limit of a flash memory device, a high-capacity storage medium using a flash memory device uses a data buffer such as a DRAM, an SRAM, etc. Because a data buffer such as a DRAM, an SRAM, etc. occupies a large area, a development to reduce a size of the data buffer is being continued. As an example, interfaces that reduce a size of a data buffer of high-capacity storage medium are being developed by sharing a part of a host system with the high-capacity storage medium. However, there is a problem that a definition of separate interfaces or an overhead due to separate hardware occurs in conventional methods for sharing memories.

SUMMARY

Example embodiments of the disclosure provide an operation method of a storage system. The operation method may include receiving a command including information about a shared memory from the host, receiving a stream command having no timeout from the host, and transmitting a first packet associated with the stream command to the host in response to the received stream command. The first packet includes information for accessing the shared memory.

Example embodiments of the disclosure provide an operation method of a host including a system memory. The operation method may include allocating a part area of the system memory as a shared memory for sharing with an external storage system, transmitting information about the shared memory to the storage system, transmitting a stream command having no timeout to the storage system, receiving a first packet associated with the stream command from the storage system, and performing an access operation with respect to the shared memory in response to the first packet.

Example embodiments of the disclosure provide an operation method of a storage system configured to communicate with a host. The method may include receiving a first command from the host, transmitting a first response including a first rewrite identifier to the host in response to the first write command, receiving a second write command from the host, transmitting a second response including the first identifier in response to the second write command, receiving a rewrite command from the host, receiving first data associated with the first write command in response to the rewrite command, and transmitting a third response for the rewrite command to the host.

Example embodiments of the disclosure provide an operation method executed by a storage system. The method includes receiving, from a host, a first command having first information identifying a memory shared by the host and the storage system; receiving, from the host, a stream command granting the storage system access to the shared memory identified by the first information, the stream command having no associated timeout period for executing the access to the shared memory; and accessing, upon gaining access to the shared memory through the stream command, the shared memory in accordance with the received first information.

BRIEF DESCRIPTION OF THE FIGURES

Embodiments of the disclosure will be described below in more detail with reference to the accompanying drawings. The embodiments of the disclosure may, however, be embodied in different forms and should not be construed as limited to the embodiments set forth herein. Rather, these embodiments are provided so that this disclosure will be thorough and complete, and will fully convey the scope of the disclosure to those skilled in the art. Like numbers refer to like elements throughout.

DETAILED DESCRIPTION OF THE EMBODIMENTS

Below, embodiments of the disclosure may be described in detail and clearly to such an extent that an ordinary one in the art easily implements the disclosure.

Figure 1:
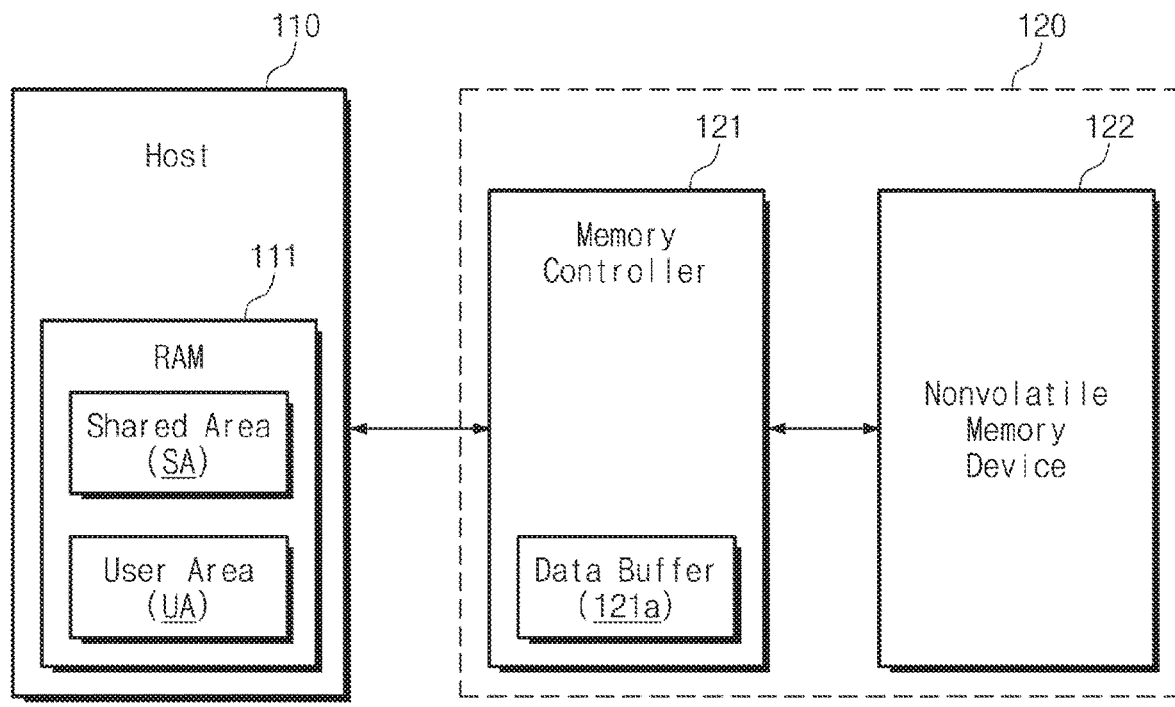
FIG. 1 is a block diagram illustrating a user system in accordance with example embodiments of the disclosure.

FIG. 1 is a block diagram illustrating a user system in accordance with example embodiments of the disclosure. Referring to FIG. 1, a user system 100 may include a host 110 and a storage system 120. The user system 100 may be a computing system such as a computer, a notebook, a server, a workstation, a mobile communication terminal, a personal digital assistant (PDA), a portable media player (PMP), a smart phone, or a wearable device.

The host 110 may write data in the storage system 120 or may read data written in the storage system 120 based on a predetermined interface. The predetermined interface may include at least one of a DDR (double data rate) interface, a USB (universal serial bus) interface, an MMC (multimedia card) interface, an eMMC (embedded MMC) interface, a PCI (peripheral component interconnection) interface, a PCI-E (PCI-express) interface, an ATA (advanced technology attachment) interface, a serial-ATA interface, a parallel-ATA interface, an SCSI (small computer small interface), an ESDI (enhanced small disk interface), an IDE (integrated drive electronics) interface, a Firewire interface, a UFS (universal flash storage) interface, and a NVMe (nonvolatile memory express) interface.

For brevity of description, it is assumed that the predetermined interface is a UFS interface. However, the disclosure is not limited thereto. An interface between the host 110 and the storage system 120 may be variously changed.

The storage system 120 may include a memory controller 121 and a nonvolatile memory device 122. The storage system 120 may be used as a high-capacity storage medium of the user system 100. The storage system 120 may be provided as a high-capacity storage medium such as a UFS card, an embedded UFS, a multimedia memory card (MMC), an embedded MMC, an SSD, etc.

The memory controller 121 may include a data buffer 121a. The memory controller 121 may write data in the nonvolatile memory device 122 or may read out data written in the nonvolatile memory device 121 under the control of the host 110. For example, the memory controller 121 may temporarily store data received from the host 110 and may control the nonvolatile memory device 122 so that data stored in the data buffer 121a is written in the nonvolatile memory device 122. Alternatively, the memory controller 121 may temporarily store data read from the nonvolatile memory device 122 in the data buffer 121a and may provide data stored in the data buffer 121a to the host 110.

The nonvolatile memory device 122 may write data or output written data under the control of the memory controller 121. The nonvolatile memory device 122 may include a volatile memory such as an SRAM (static RAM), a DRAM (dynamic RAM), an SDRAM (synchronous DRAM), etc. or a nonvolatile memory such as a ROM (read only memory), a PROM (programmable ROM), an EPROM (electrically programmable ROM), an EEPROM (electrically erasable and programmable ROM), a flash memory, a PRAM (phase change RAM), an MRAM (magnetic RAM), an RRAM (resistive RAM), an FRAM (ferroelectric RAM), etc. The nonvolatile memory device 122 may include a plurality of memory dies, a plurality of memory chips, or a plurality of memory packages.

The host 110 may include a RAM 111. The RAM 111 may be used as a main memory, a buffer memory, a cache memory, etc. of the host 110 or the user system 100. The RAM 111 may include a random access memory such as an SRAM (static RAM), a DRAM (dynamic RAM), an SDRAM (synchronous DRAM), etc.

The RAM 111 may include a user area (UA) and a shared area (SA). The user area (UA) may indicate a storage space in which an operating system (OS) driven in the host 110 or data processed by an application is temporarily stored. That is, the user area (UA) of the RAM 111 may be used as a normal system memory space of the user system 100.

The shared area (SA) may indicate a storage space capable of being accessed by the storage system 120. For example, the storage system 120 may store data in the shared area (SA) or may read data stored in the shared area (SA). In this case, an access operation to the shared area (SA) may be performed without a separate hardware circuit or a change of a predetermined interface. As an example, the host 110 may provide a specific command having no timeout or a command having an infinite timeout to the storage system 120. The storage system 120 may access the shared area (SA) through a signal for the specific command such as a response (RES), a ready to transfer (RTT), a data-in (DIN), a data-out (DOUT), etc.

The aforementioned signals may have a signal form defined by a predetermined interface between the host 110 and the storage system 120. Accordingly, the storage system 120 may access the shared area (SA) without a separate hardware circuit or a change of a predetermined interface. An access operation to the shared area (SA) of the storage system 120 will be described in more detail with reference to views below.

As described above, the memory controller 121 may manage a data input/output between the host 110 and the nonvolatile memory device 122 using the data buffer 121a. In this case, performance of the storage system 120 may be improved without an increase of a size of the data buffer 121a by storing data in the shared area (SA) of the host 110 or reading data stored in the shared area (SA).

Figure 2:
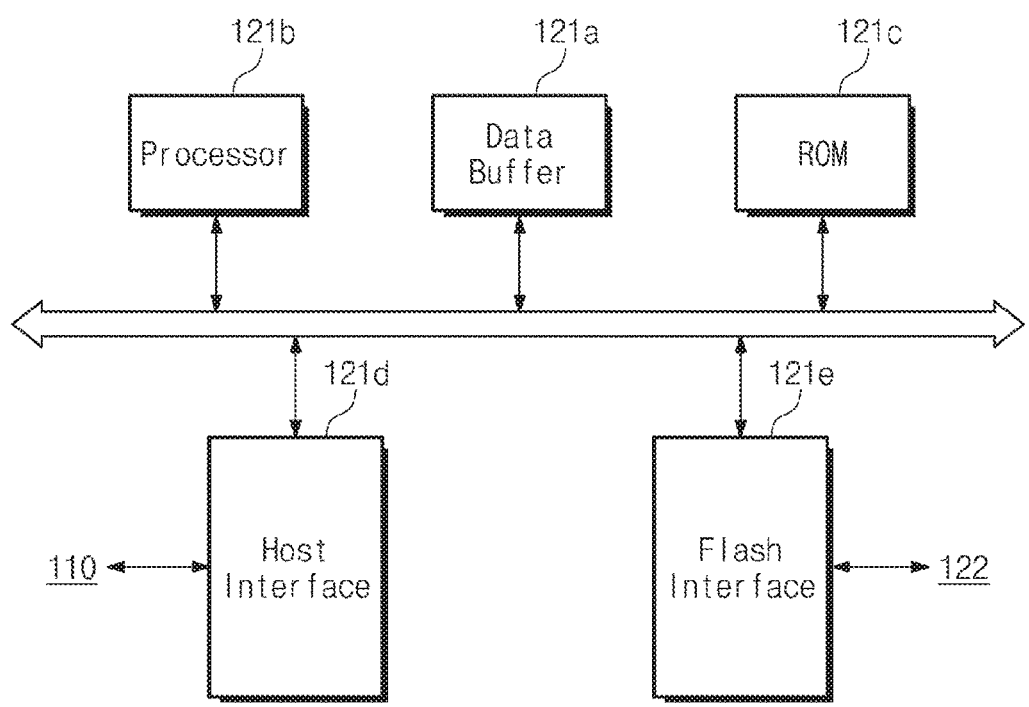
FIG. 2 is a block diagram illustrating a memory controller of FIG. 1 in detail.

FIG. 2 is a block diagram illustrating a memory controller of FIG. 1 in detail. Referring to FIGS. 1 and 2, the memory controller 121 may include a data buffer 121a, a processor 121b, a ROM 121c, a host interface 121d, and a flash interface 121e.

The processor 121b can control an overall operation of the memory controller 121. The data buffer 121a may be used as a buffer memory, a cache memory, or a working memory of the memory controller 121. The data buffer 121a may be an SRAM. The ROM 121c may store various information required when the memory controller 121 operates in a firmware form. The processor 121b may be configured to execute information or a program code stored in the data buffer 121a or the ROM 121c.

The memory controller 121 can communicate with the host 110 through the host interface 121d. For brevity of description, it is assumed that the host interface 121d includes a universal flash storage (UFS) interface. For example, the host interface 121d may include layers such as a UFS interconnect layer (UIC), a UFS transport protocol layer (UTP), etc. for a communication with the host 110. However, the disclosure is not limited thereto and the host interface 121d may be embodied based on one of the various communication interfaces described above.

The memory controller 121 may communicate with the nonvolatile memory device 122 through the flash interface 121e. The flash interface 121e may include a NAND interface.

Figure 3:
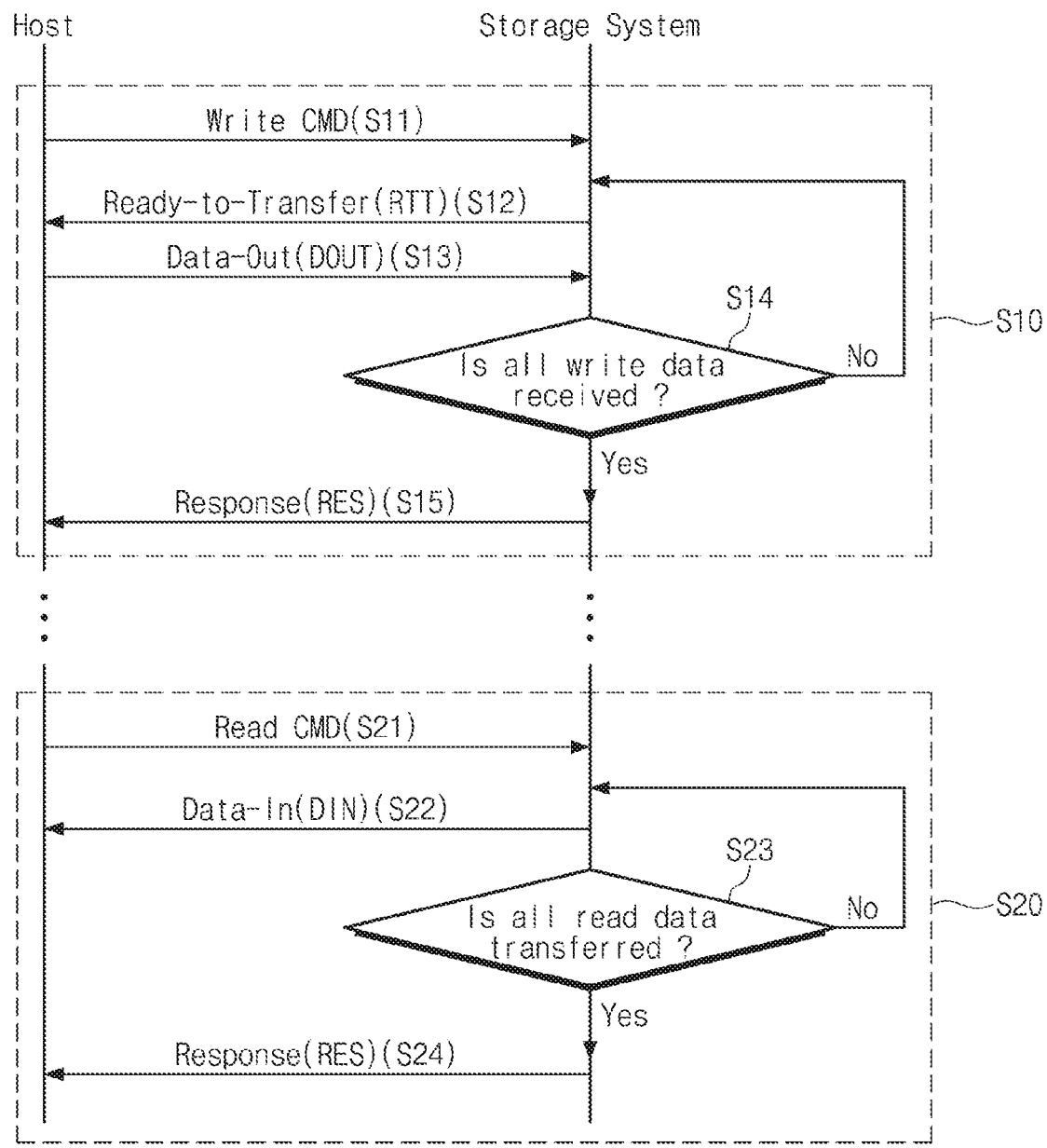
FIG. 3 is a flowchart illustrating a basic data input/output operation between a host and a storage system of FIG. 1.

FIG. 3 is a flowchart illustrating a basic data input/output operation between a host and a storage system of FIG. 1. For convenience of description, it is assumed that the host 110 and the storage system 120 communicate with each other based on the UFS interface. Operation methods will be described based on the host 110 and the storage system 120 with reference to views below. However, the disclosure is not limited thereto. For example, an operation of the host 110 may be performed by a part (e.g., a device driver) of various constituent elements included in the host 110 and an operation of the storage system 120 may be performed by a part (e.g., firmware or the processor 121b of the memory controller 121 that drives the firmware) of various constituent elements included in the storage system 120.

It is assumed that signals or information transmitted between the host 110 and the storage system 120 are provided in the form of packet. The packet indicates the form of information exchanged between the host 110 and the storage system 120, and may include various information depending on the type of the packet. The packet may include a packet form of a UFS protocol information unit (UPIU) defined by a UFS interface.

Referring to FIGS. 1 through 3, the host 110 and the storage system 120 may perform a normal write operation through operations of S10. The normal write operation may indicate an operation in which the host 110 stores data in the storage system 120.

The operation S10 may include operations of S11 to S15. In an operation S11, the host 110 transmits a write command to the storage system 120.

In the operation S12, the storage system 120 may transmit ready-to-transfer (RTT) to the host 110 in response to the write command. The storage system 120 can determine a size of data capable of being received to the data buffer 121a in response to the write command. The storage system 120 may transmit ready-to-transfer (RTT) including information (e.g., a buffer offset and a buffer length) with respect to a size of the determined data to the host 110.

In the operation S13, the host 110 may transmit a data-out (DOUT) to the storage system 120 in response to the ready-to-transfer (RTT). The host 110 may include all or part of write data in the data-out (DOUT) to transmit the data-out (DOUT) including all or part of the write data to the storage system 120 based on the information with respect to the data size included in the RTT.

Although not illustrated in the drawing, the storage system 120 may temporarily store write data included in the received data-out (DOUT) in the data buffer 121a and may program the write data stored temporarily in the data buffer 121a in the nonvolatile memory device 122.

In the operation S14, the storage system 120 may determine whether all the write data is received. In the case where all the write data is not received (e.g., the case where there remains write data that is not received), the host 110 and the storage system 120 may repeatedly perform the operations of S12 and S13.

In the case where all the write data is received (e.g., the case where there does not remain write data that is not received), in the operation S15, the storage system 120 transmits a response (RES) to the write command to the host 110. The host 110 may recognize that an operation with respect to the write command is completed through the received response (RES).

Referring to FIGS. 1 through 3, the host 110 and the storage system 120 may perform a normal read operation through operations of S20. The normal read operation may indicate an operation in which the host 110 reads data stored in the storage system 120.

The operation S20 may include operations of S21 through S24. In the operation S21, the host 110 may transmit a read command to the storage system 120.

In the operation S22, the storage system 120 may provide a data-in (DIN), including all or a part of the data corresponding to the read command, to the host in response to the read command. For example, the read command may include a logical address of read data. The storage system 120 may read data corresponding to the logical address from the nonvolatile memory device 122 and may provide a data-in (DIN) including the read data to the host 110.

In the operation S23, the storage system 120 may determine whether all the read data is transmitted. In the case where all the read data is not transmitted (e.g., the case where there remains read data that is not transmitted), the storage system 120 may repeatedly perform the operation of S22 to transmit the remaining read data to the host 110.

In the case where all the read data is transmitted (e.g., the case where there does not remain read data that is not transmitted), in the operation S24, the storage system 120 may transmit a response (RES) to the read command to the host 110. The host 110 may recognize that an operation with respect to the read command is completed through the received response (RES).

As described above, the host 110 and the storage system 120 may perform a normal write operation and a normal read operation by sending and receiving a predetermined signal or information according to a predetermined interface (e.g., UFS interface).

Figure 4:
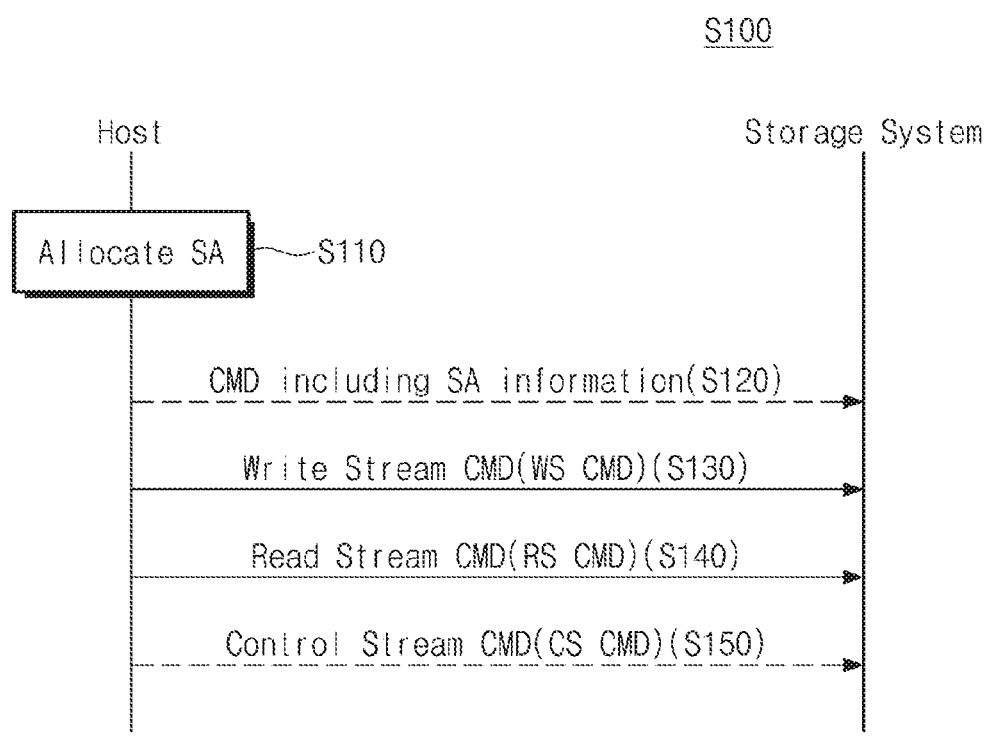
FIG. 4 is a flowchart illustrating operations of a host and a storage system in accordance with example embodiments of the disclosure.

FIG. 4 is a flowchart illustrating operations of a host and a storage system in accordance with example embodiments of the disclosure. An access operation to the shared area (SA) of the storage system 120 is described with reference to drawings below.

In the description that follows, signals that are transmitted and received between the host 110 and the storage system 120 have a similar meaning to that described with reference to FIG. 3. It is assumed that a term 'stream' means a signal/data transmission path or a signal/data transmission means which the storage system 120 uses to access the shared area (SA).

It is assumed that a state in which the stream is open means that the storage system 120 is in a state capable of transmitting signal/data for accessing the shared area (SA). That is, the storage system 120 may read data stored in the shared area (SA) using the ready-to-transfer (RTT) and the data-out (DOUT) in a state in which a read stream is open and may store data in the shared area (SA) using the data-in (DIN) in a state in which a write stream is open.

It is assumed that a 'write stream' indicates an information transmission path or an information transmission means through which the storage system 120 can write or store data in the shared area (SA), a 'read stream' indicates an information transmission path or an information transmission means through which the storage system 120 can read data stored in the shared area (SA), and a 'control stream' indicates an information transmission path or an information transmission means through which the storage system 120 can transmit control information for controlling the shared area (SA).

That structures of signals or information are similar to one another means that bit values of areas or fields in which a form of information is predetermined by a specific interface are the same but bit values of reserved areas or reserved fields are different from one another. Even if bit values of reserved areas or reserved fields are changed, signals may be normally transmitted and received in the predetermined interface.

In example embodiments, operations of S110 to S150 may be performed during an initialization operation (hereinafter it is referred to as S100) of the user system 100. While the user system 100 is booted, the host 110 and the storage system 120 may perform an initialization operation for a communication. At this time, a read stream, a write stream and a control stream which the storage system 120 uses to access the shared area (SA) may be opened by performing, by the host 110, the operations of S110 to S150.

Referring to FIGS. 1 and 4, in the operation S110, the host 110 may allocate the shared area (SA). For example, the host 110 may allocate a part of storage areas of the RAM 111 as the shared area (SA). The shared area (SA) and a user area (UA) may be divided as a logical area.

In the operation S120, the host 110 may transmit a command CMD including information about the allocated shared area (SA) to the storage system 120. The information about the allocated shared area (SA) may include information on a buffer size, a buffer address, a buffer offset, etc. of the shared area (SA). The information about the shared area (SA) may be included in a reserved area or a reserved field of the command CMD.

The storage system 120 may recognize a size and a buffer address of the shared area (SA) based on the command received in the operation S120.

In the operation S130, the host 110 may transmit a write stream command (WS CMD) to the storage system 120. The write stream command (WS CMD) may indicate a command for opening a write stream through which the storage system 120 can write data in the shared area (SA).

The write stream command (WS CMD) may have a similar structure to the read command described with reference to FIG. 3 and bit values of a part of the reserved area or the reserved field may be different. The write stream command (WS CMD) may be constituted by setting a part of the reserved area or the reserved field of the read command of FIG. 3 to a specific value. The storage system 120 may write data in the shared area (SA) by providing a data-in (DIN) associated with the write stream command (WS CMD) to the host 110.

In the operation S140, the host 110 may transmit a read stream command (RS CMD) to the storage system 120. The read stream command (RS CMD) may indicate a command for opening a read stream through which the storage system 120 can read data stored in the shared area (SA). The read stream command (RS CMD) may have a similar structure to the write command described with reference to FIG. 3 and bit values of a part of the reserved area or the reserved field may be different. The read stream command (RS CMD) may be constituted by setting a part of the reserved area or the reserved field of the write command of FIG. 3 to a specific value. The storage system 120 may read data stored in the shared area (SA) by providing a ready-to-transfer (RTT) associated with the read stream command (RS CMD) to the host 110 and receiving a data-out (DOUT) from the host 110.

In the operation S150, the host 110 may transmit a control stream command (CS CMD) to the storage system 120. The control stream command (CS CMD) may indicate a command for opening a control stream through which the storage system 120 can transmit a specific command (hereinafter it is referred to as 'control information') with respect to the shared area (SA). The control information may include a command for operations such as a movement, copy, or swap of data from the user area (UA) to the shared area (SA), or deletion of data of the shared area (SA).

As described above, the stream commands may be implemented by setting a bit value of the reserved area or the reserved field of the normal write command and the normal read command to a specific value. Thus, it is possible to implement a stream open command without a change of a separate hardware circuit or a conventional interface.

Each of the write stream command (WS CMD), the read stream command (RS CMD), and the control stream command (CS CMD) may be a command having an infinite timeout or no timeout. For example, a normal write command, a normal read command, or a separate command may have a predetermined timeout. In this case, when the normal write command, the normal read command, or the separate command are transmitted to the storage system 120 and a separate response is not received until the predetermined time goes by, the user system 100 may cause an error or may stop an operation with respect to a command not processed.

However, since the stream commands according to the disclosure have no timeout, even if the host 110 does not receive a response to the stream command from the storage system 120, the user system 100 may normally operate and may not stop operations with respect to the stream commands Even if the host 110 does not receive a separate response from the storage system 120, the stream commands may be maintained on a command queue of the host 110 and the storage system 120.

A command of the operation S120 may be omitted. For example, in the case where the command of the operation S120 is omitted, information about the shared area (SA) may be included in the write stream command (WS CMD) or the read stream command (RS CMD), the host 110 may transmit the write stream command (WS CMD) or the read stream command (RS CMD), including the information about the shared area (SA), to the storage stream 120.

The operation S150 of transmitting the control stream command (CS CMD) may be omitted. In the case where the operation S150 is omitted, the storage system 120 may provide control information (CI) to the host 110 using signals (e.g., data-in, data-out, response, etc.) associated with the write stream command (WS CMD) or the read stream command (RS CMD). A method of transmitting the control information (CI) will be described in further detail with reference to FIGS. 8 through 10.

Figure 5:
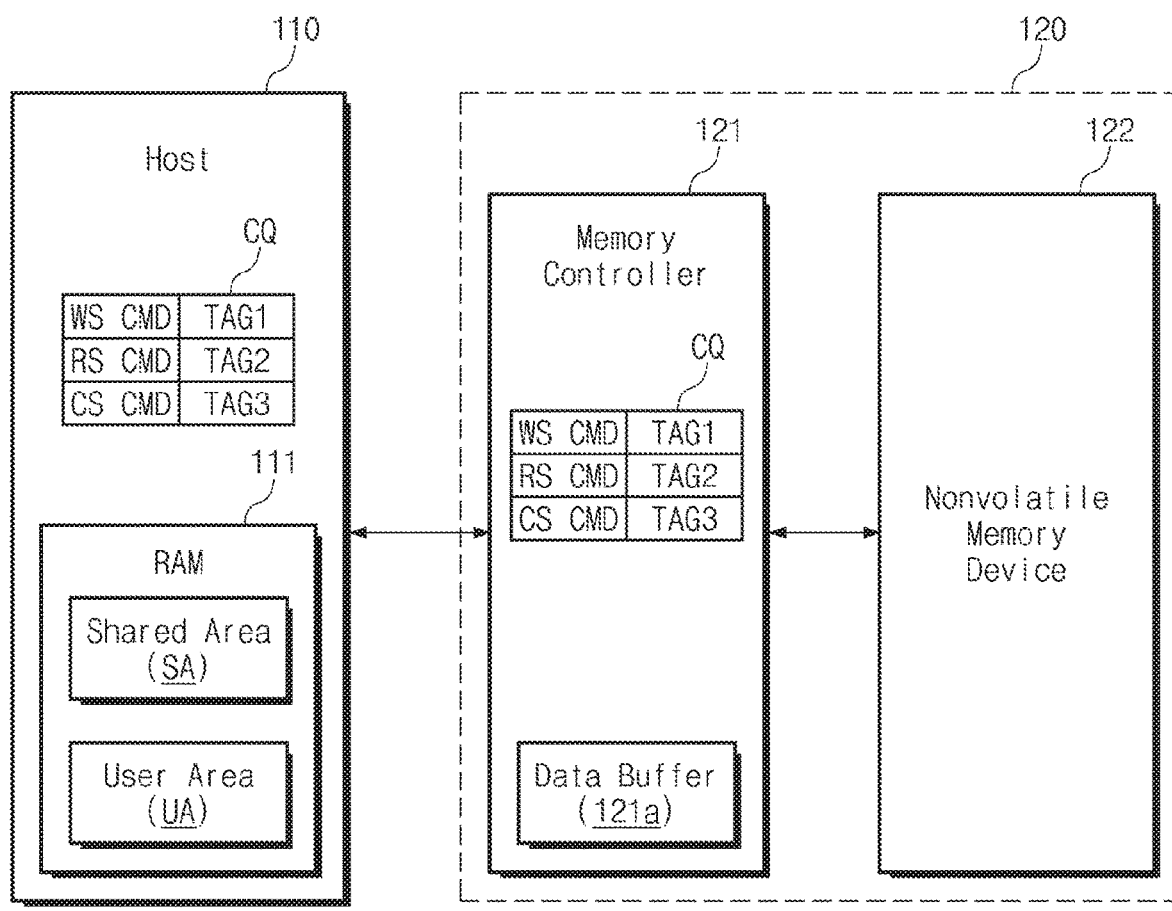
FIG. 5 is a block diagram illustrating a user system according to an operation of FIG. 4.

FIG. 5 is a block diagram illustrating a user system according to an operation of FIG. 4. Referring to FIGS. 4 and 5, the user system 100 may include the host 110 and the storage system 120. The host 110 may include the RAM 111 and the RAM 111 may include the shared area (SA) and the user area (UA). The storage system 120 may include the memory controller 121 and the nonvolatile memory device 122. The memory controller 121 may include the data buffer 121a. A detailed description of the constituent elements described above among constituent elements of the user system 100 is omitted.

After the initialization operation of S100 illustrated in FIG. 4, each of the host 110 and the storage system 120 may manage the write stream command (WS CMD), the read stream command (RS CMD), and the control stream command (CS CMD) as command queues. For example, first through third tags (TAG1 to TAG3) are given to each of the write stream command (WS CMD), the read stream command (RS CMD) and the control stream command (CS CMD), and each stream command may be managed in a command queue (CQ) of each of the host 110 and the memory controller 121.

The storage system 120 may access the shared area (SA) by transmitting a data-in, ready to transfer (RTT), a response, etc. associated with the write stream command (WS CMD), the read stream command (RS CMD), or the control stream command (CS CMD) managed in the command queue (CQ) to the host 110.

As described above, the control stream command (CS CMD) may be omitted. Since each of the write stream command (WS CMD), the read stream command (RS CMD) and the control stream command (CS CMD) has no timeout, as long as there is no separate response from the storage system 120, each stream command may be maintained on the command queue (CQ). Even if the host 110 receives a response from the storage system 120, the stream command may be retransmitted to the storage system 120 to reopen a stream corresponding to the received response.

An operation of opening a write stream, a read stream, and a shared area command stream through a stream command in an initialization operation of the user system 100 was described with reference to FIGS. 4 and 5. However, the disclosure is not limited thereto. For example, in the initialization operation of the user system 100, stream commands may be set in advance to be loaded into the command queue (CQ) of the host 110 and the storage system 120 without explicit stream commands That is, in the initialization operation of the user system 100, even if the host 110 does not provide specific stream commands to the storage system 120, the write stream command (WS CMD), the read stream command (RS CMD), or the control stream command (CS CMD) may be loaded into the command queue (CQ) of the host 110 and the storage system 120 in advance. Each of the write stream command (WS CMD), the read stream command (RS CMD), or the control stream command (CS CMD) may be managed based on a predetermined command tag.

Figure 6:
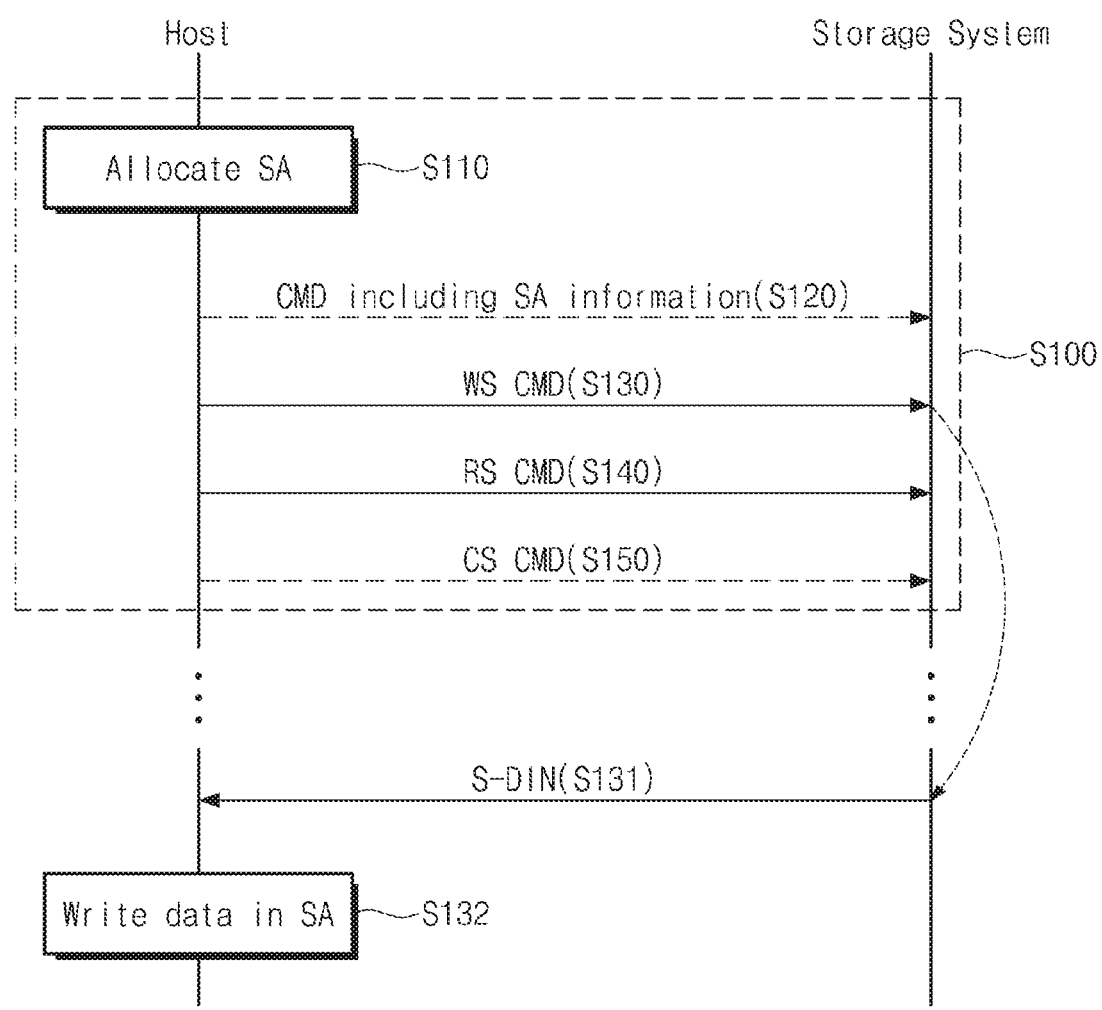
FIG. 6 is a flowchart illustrating an operation in which a storage system in accordance with example embodiments of the disclosure writes data in a shared area.

FIG. 6 is a flowchart illustrating an operation in which a storage system in accordance with example embodiments of the disclosure writes data in a shared area. For convenience of description, a data-out, a data-in, a ready to transfer, and response signals associated with stream commands may be referred to as a stream data-out (S-DOUT), a stream data-in (S-DIN), a stream ready to transfer (S-RTT), and a stream response (S-RES), respectively. The stream data-out (S-DOUT), the stream data-in (S-DIN), the stream ready to transfer (S-RTT), and the stream response (S-RES) may have a similar structure to a data-out (DOUT), a data-in (DIN), a ready to transfer (RTT), and a response (RES) used in a normal write operation and a normal read operation respectively.

Referring to FIGS. 1, 4 and 6, the host 110 and the storage system 120 may perform an operation of S100. The operation of the S100 may include operations of S110 to S150. Since the operations of S110 to S150 were described with reference to FIGS. 4 and 5, a description thereof is omitted.

The storage system 120 may write data in the shared area (SA) of the RAM 111 of the host 110. In an operation S131, the storage system 120 may provide the stream data-in (S-DIN) to the host 110. For example, the stream data-in (S-DIN) may include information of data to be written in the shared area (SA) and an address, offset, or length of a buffer in which data is stored.

The stream-data-in (S-DIN) may be a signal or information associated with the write stream command (WS CMD). As described with reference to FIG. 4, the write stream command (WS CMD) may have a similar structure to a normal read command. The storage system 120 may transmit the stream data-in (S-DIN) to the host 110 in response to the write stream command (WS CMD). The stream data-in (S-DIN) may include information about a buffer address, a buffer offset, or a buffer length of the shared area (SA) in which data is to be written.

In an operation S132, the host 110 may write data included in the received stream data-in (S-DIN) in the shared area (SA).

Figure 7:
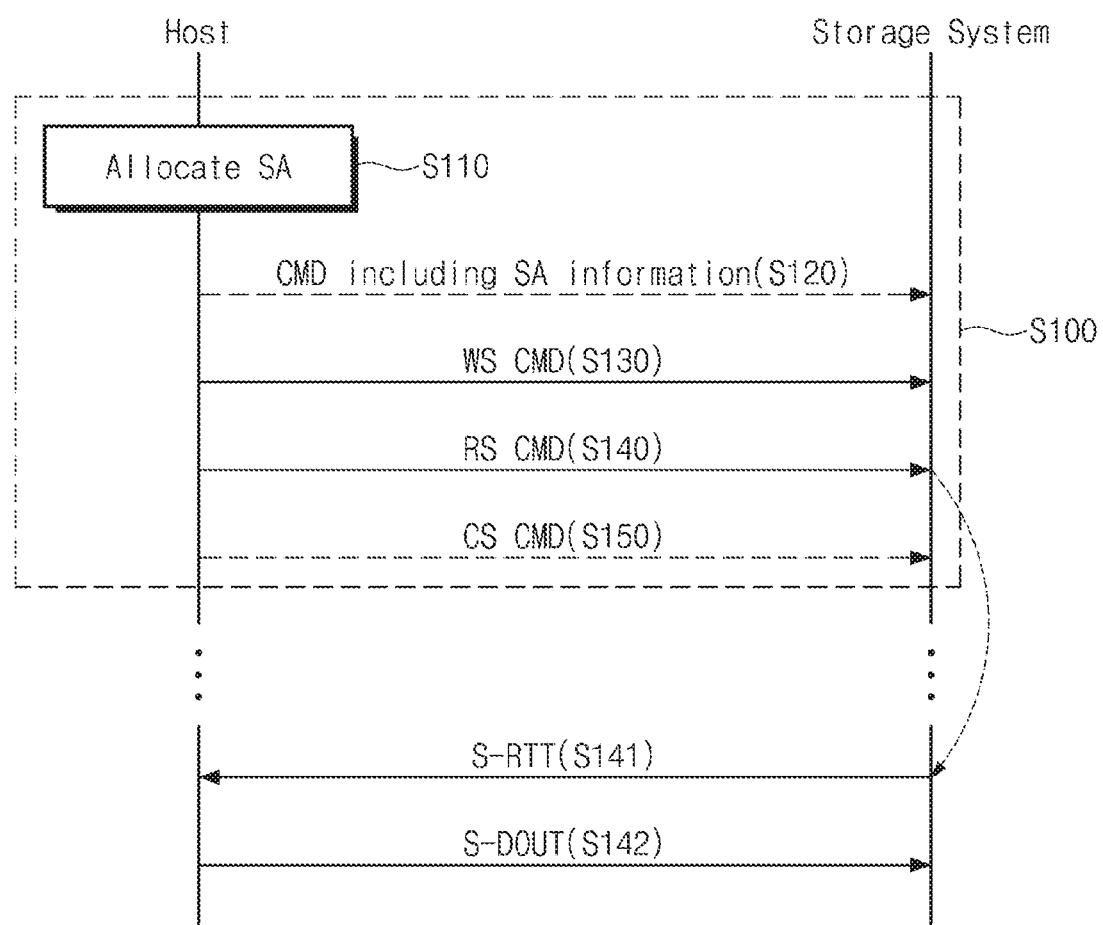
FIG. 7 is a flowchart illustrating an operation in which a storage system in accordance with example embodiments of the disclosure reads data stored in a shared area.

FIG. 7 is a flowchart illustrating an operation in which a storage system in accordance with example embodiments of the disclosure reads data stored in a shared area. Referring to FIGS. 1, 4 and 7, the host 110 and the storage system 120 may perform an operation of S100. The operation of the S100 may include operations of S110 to S150. Since the operations of S110 to S150 were described with reference to FIGS. 4 and 5, a description thereof is omitted.

The storage system 120 may read data stored in the shared area (SA) of the RAM 111 of the host 110. In an operation S141, the storage system 120 may provide the stream ready to transfer (S-RTT) to the host 110. For example, the stream to ready (S-RTT) may include information about a buffer address, a buffer offset, or a buffer length of data that needs to be read, that is, data stored in the shared area (SA).

As described above, the read stream command (RS CMD) may be similar to a normal write command of FIG. 3. That is, the storage system 120 may transmit the ready to transfer (S-RTT) to the host 110 in response to the read stream command (RS CMD). Similarly, the ready to transfer (S-RTT) may have a similar structure to the ready to transfer (RTT) described with reference to FIG. 3.

In an operation S142, the host 110 may transmit the stream data-out (S-DOUT) to the storage system 120 in response to the received ready to transfer (S-RTT). The stream data-out (S-DOUT) may include read data requested by the storage system 120.

As described with reference to FIGS. 6 and 7, the write stream command (WS CMD) has a similar structure to a normal read command and the storage system 120 may write data in the shared area (SA) by transmitting the stream data-in (S-DIN) to the host 110 in response to the write stream command (WS CMD).

The read stream command (RS CMD) has a similar structure to a normal write command and the storage system 120 may receive the stream data-out (S-DOUT) including the read data from the host 110 by transmitting the stream ready to transfer (S-RTT) to the host 110 in response to the read stream command (RS CMD). Thus, the storage system 120 may access the shared area (SA) without a separate hardware circuit or a change of an interface.

Figure 8:
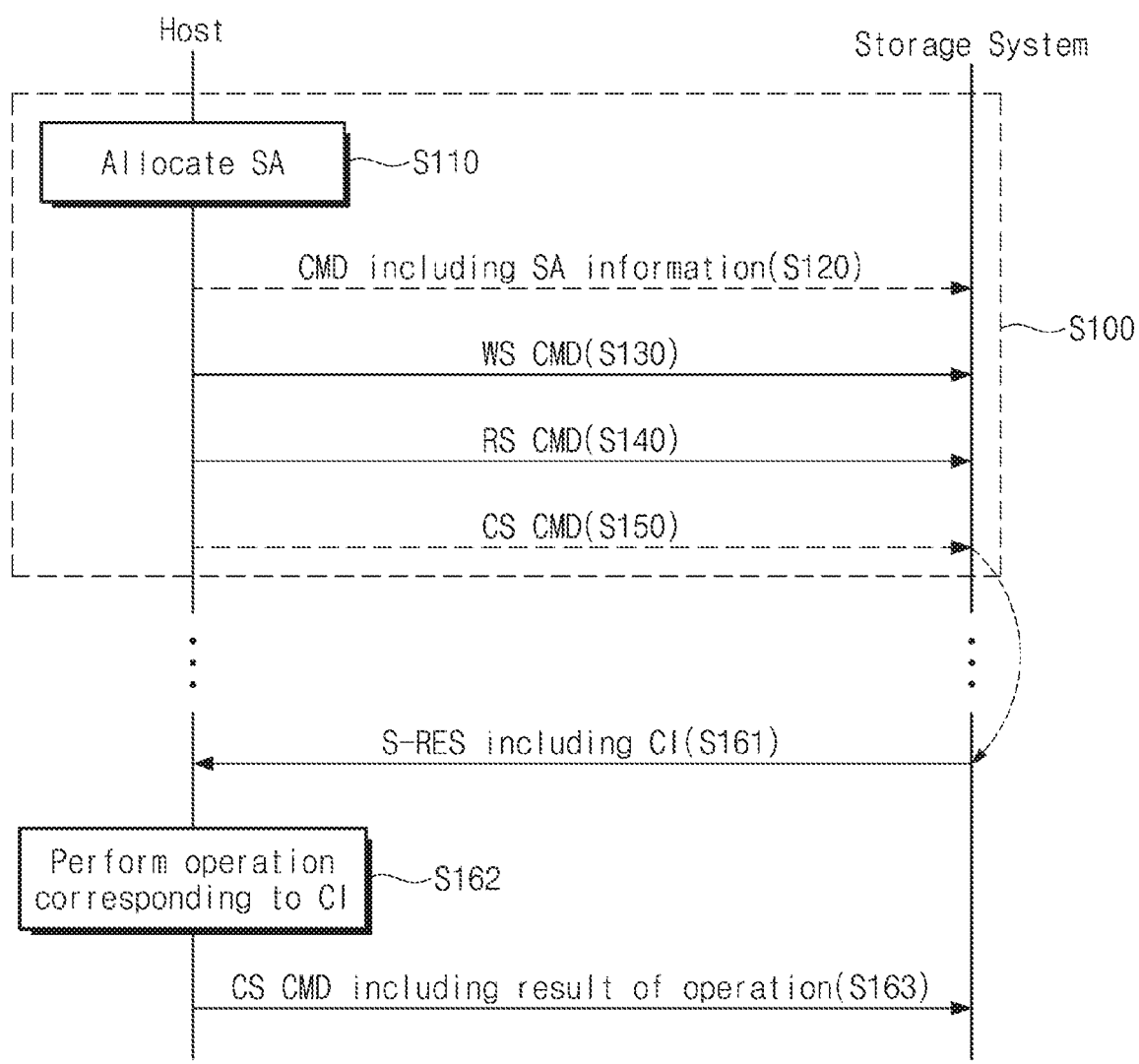
FIGS. 8 through 10 are flowcharts illustrating an operation in which a storage system in accordance with example embodiments of the disclosure controls a shared area.
Figure 9:
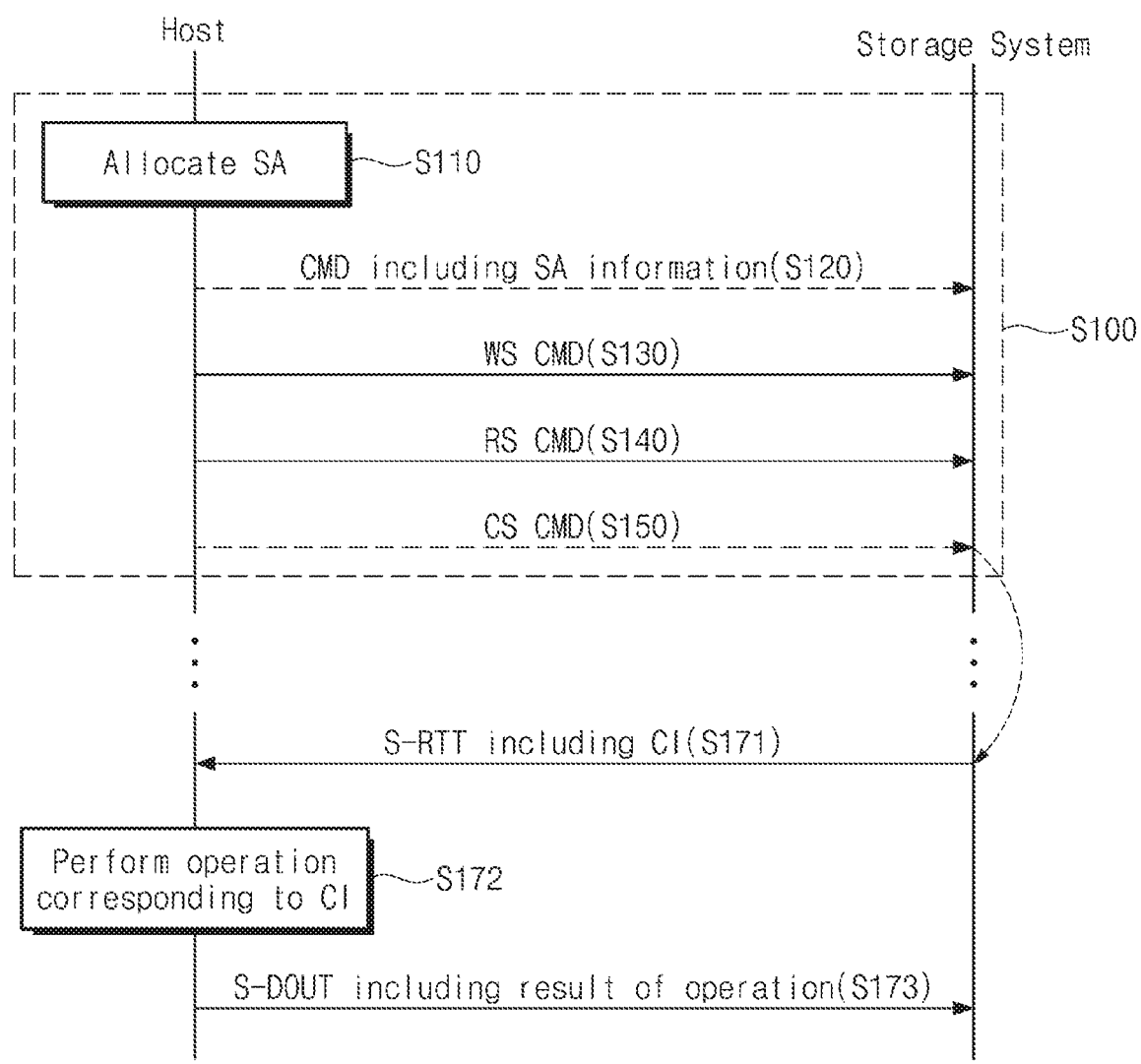
Figure 10:
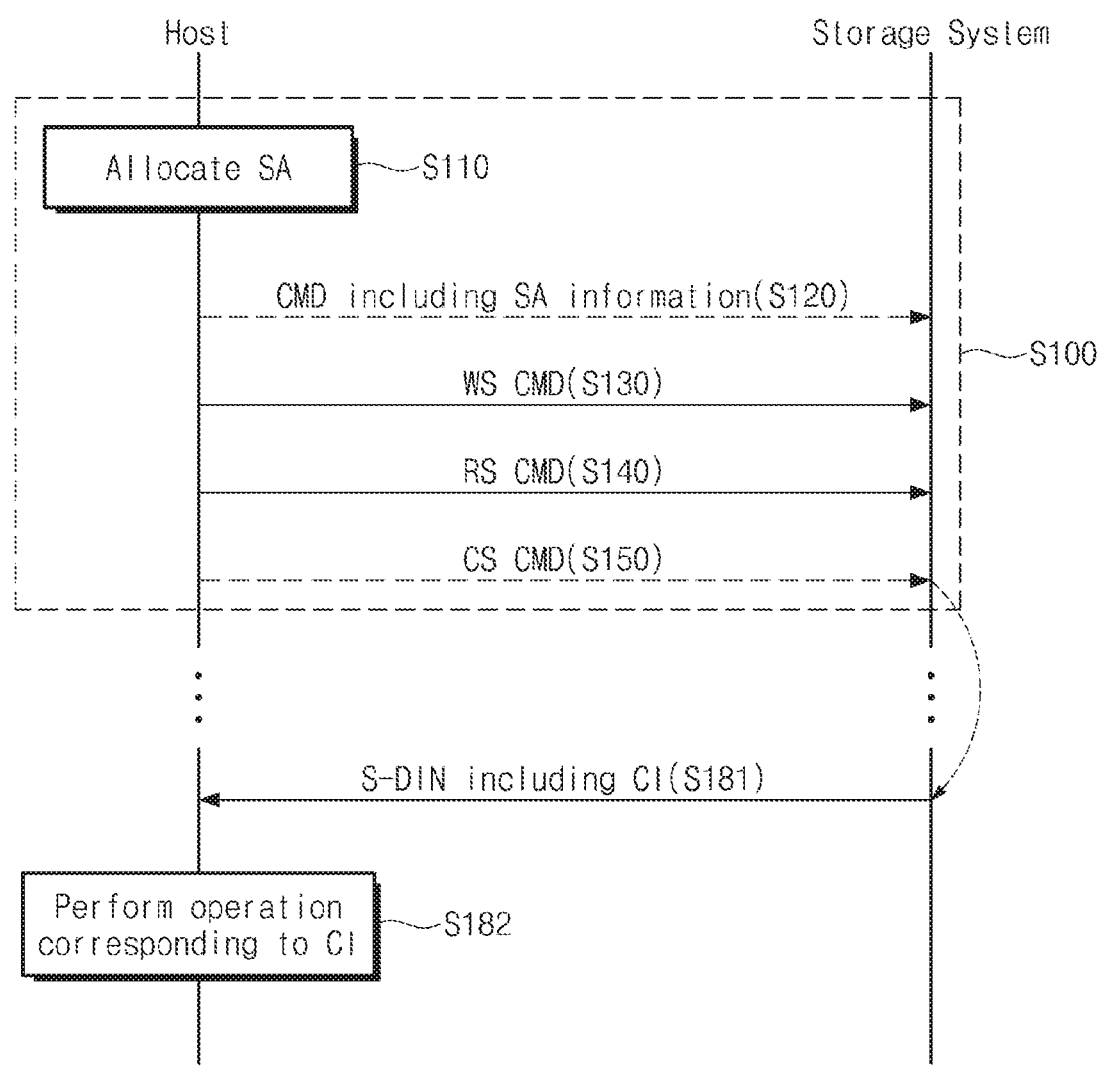

FIGS. 8 through 10 are flowcharts illustrating an operation in which a storage system in accordance with example embodiments of the disclosure controls a shared area. For brevity of description, it is assumed that control information (CI) for controlling the shared area (SA) is transmitted to the host 110 in response to the control stream command (CS CMD).

However, the disclosure is not limited thereto. For example, as described with reference to FIG. 4, the control stream command (CS CMD) may be omitted. In this case, the stream response (S-RES), the stream data-in (S-DIN), or the stream ready to transfer (S-RTT) in which the control information (CI) is included may be provided to the host 110 in response to the write stream command (WS CMD), or the read stream command (RS CMD).

First, referring to FIGS. 1, 3, 4 and 8, the host 110 and the storage system 120 may perform an initialization operation (S100). An operation of S100 may include operations of S110 to S150, and since this was described with reference to FIGS. 4 and 5, a detailed description thereof is omitted.

The storage system 120 may transmit control information (CI) for performing other operations besides the operation of accessing the shared area (SA) to the host 110. Other operations may include operations such as a copy, a swap, a movement, etc. of data from the user area (UA) to the shared area (SA) or deletion, copy, etc. of data of the shared area (SA).

In an operation S161, the storage system 120 may transmit the stream response (S-RES) including the control information (CI) to the host 110. The stream response (S-RES) may be associated with the control stream command (CS CMD).

The stream response (S-RES) may have a similar structure to the response (RES) described with reference to FIG. 3. The stream response (S-RES) including the control information (CI) may be constituted by adding the control information (CI) to a reserved area of the responses described with reference to FIG. 3.

In an operation S162, the host 110 may perform an operation corresponding to the control information (CI) in response to the received stream response (S-RES). In an operation S163, the host 110 may transmit the control stream command (CS CMD) including result information of the operation to the storage system 120.

In example embodiments, in an operation S161, a control stream may become a close state by providing, by the storage system 120, the stream response (S-RES) to the host 110. After completing an operation corresponding to the control information (CI), the host 110 may transmit the control stream command (CS CMD) to the storage system 120 to re-open the control stream. Accordingly, the control stream may become an open state again. A result of an operation or information of a response is added to a reserved area or a reserved field of the control stream command (CS CMD) and thereby the storage system 120 may recognize the result of an operation.

As described above, the storage system 120 may control the shared area (SA) by exchanging, by the host 110 and the storage system 120, the stream response (S-RES) and the control stream command (CS CMD). In this case, since signals or information transmitted and received between the host 110 and the storage system 120 has a similar structure to a response (RES) and a command (CMD) used in a normal write or read operation, the storage system 120 may control the shared area (SA) without a separate hardware circuit or a change of an interface.

Referring to FIGS. 1, 3, 4 and 9, the host 110 and the storage system 120 may perform an initialization operation (S100). An operation of S100 may include operations of S110 to S150, and since this was described with reference to FIGS. 4 and 5, a detailed description thereof is omitted.

In an operation S171, the storage system 120 may transmit the stream ready to transfer (S-RTT) including the control information (CI) to the host 110.

The stream ready to transfer (S-RTT) may have a similar structure to the ready to transfer (RTT) described with reference to FIG. 3. The stream ready to transfer (S-RTT) including the control information (CI) may be constituted by adding the control information (CI) to a reserved area of the ready to transfer (RTT) described with reference to FIG. 3.

In an operation S172, the host 110 may perform an operation corresponding to the control information (CI) in response to the received stream ready to transfer (S-RTT). Since the operation of S172 is similar to the operation of S162 of FIG. 8, a description thereof is omitted.

In an operation S173, the host 110 may transmit a result of an operation corresponding to the control information (CI) or a stream data-out (S-DOUT) including information of a response to the storage system 120.

As described above, the storage system 120 may control the shared area (SA) by exchanging, by the host 110 and the storage system 120, the stream ready to transfer (S-RTT) and the stream data-out (S-DOUT). In this case, since signals or information transmitted and received between the host 110 and the storage system 120 has a similar structure to a ready to transfer (RTT) and a data-out (DOUT) used in a normal operation, the storage system 120 can control the shared area (SA) without a separate hardware circuit or a change of an interface.

Although not illustrated in the drawing, the operations of S171 and S173 may be changed to the operations of S141 and S142 of FIG. 7. For example, in the case where the control stream command (CS CMD) is omitted, the storage system 120, in the operation of S141 of FIG. 7, may add the control information (CI) to the stream ready to transfer (S-RTT) to provide the stream ready to transfer (S-RTT) including the control information (CI) to the host 110. In this case, as described with reference to FIG. 7, the stream ready to transfer (S-RTT) may be information provided in response to the read stream command (RS CMD). That is, in the case where the control stream command (CS CMD) is omitted, the storage system 120 may control the shared area (SA) by providing the stream ready to transfer (S-RTT) including the control information (CI) to the host 110 in response to the read stream command (RS CMD).

Referring to FIGS. 1, 3, 4 and 10, the host 110 and the storage system 120 may perform an initialization operation (S100). An operation of S100 may include operations of S110 to S150, and since this was described with reference to FIGS. 4 and 5, a detailed description thereof is omitted.

In an operation S181, the storage system 120 may transmit the stream data-in (S-DIN) including the control information (CI) to the host 110. The stream data-in (S-DIN) may have a similar structure to the data-in (DIN) described with reference to FIG. 3. The stream data-in (S-DIN) including the control information (CI) may be constituted by adding the control information (CI) to a data area of the data-in (DIN) described with reference to FIG. 3.

In an operation S182, the host 110 may perform an operation corresponding to the control information (CI). Since an operation of S182 is similar to the operations of S162 of FIG. 8 and S172 of FIG. 9, a description thereof is omitted.

Although not illustrated in the drawing, the control information (CI) included in the stream data-in (S-DIN) of the operation S181 may be stored in the shared area (SA). The host 110 may perform an operation corresponding to the control information (CI) by analyzing the control information (CI) stored in the shared area (SA).

The storage system 120 may change a command ID of a command (e.g., the control stream command (CS CMD)) corresponding to the stream data-in (S-DIN). The changed command ID may be included in the stream data-in (S-DIN) to be provided to the host 110. The control information (CI) and the changed command ID included in the stream data-in (S-DIN) may be stored in the shared area (SA). The host 110 (in particular, a device driver (not illustrated)) may sense a change of the command ID by polling the shared area (SA). In the case where the command ID is changed, the host 110 may analyze the control information (CI) stored in the shared area (SA) to perform a corresponding operation.

The host 110 may not provide a separate response with respect to an operation according to the control information (CI) described with reference to FIG. 10.

As described with reference to FIGS. 8 through 10, using the stream ready to transfer (S-RTT), the stream data-in (S-DIN), the stream response (S-RES) associated with the stream commands (WS CMD, RS CMD, CS CMD) having no timeout, the storage system 120 may provide the control information (CI) for controlling the shared area (SA) to the host 110. In this case, since signals or information transmitted and received between the host 110 and the storage system 120 have a similar structure to signals or information used in a normal write or read operation, the storage system 120 can control the shared area (SA) without a separate hardware circuit or a change of an interface.

Figure 11:
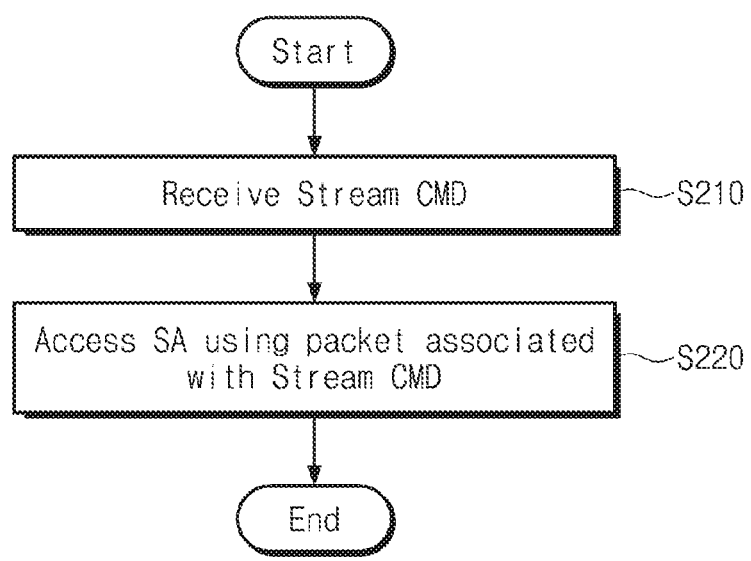
FIG. 11 is a flowchart illustrating an operation of a storage system in accordance with example embodiments of the disclosure.

FIG. 11 is a flowchart illustrating an operation of a storage system in accordance with example embodiments of the disclosure. Referring to FIGS. 1 and 11, in an operation of S210, the storage system 120 may receive a stream command. As described with reference to FIGS. 4 and 5, the storage system 120 may receive the write stream command (WS CMD), the read stream command (RS CMD), or the control stream command (CS CMD). The write stream command (WS CMD), the read stream command (RS CMD), or the control stream command (CS CMD) may have a similar structure to the write command or the read command described with reference to FIG. 3 and may be a command having no timeout or an infinite timeout.

In an operation S220, the storage system 120 may access the shared area (SA) using signals or information associated with a stream command. As described with reference to FIGS. 6 through 10, the storage system 120 may store data in the shared area (SA), may read data stored in the shared area (SA), or may provide the control information (CI) with respect to the shared area (SA) to the host 110 using signals or information such as the stream data-in (S-DIN), the stream data-out (S-DOUT), the stream ready to transfer (S-RTT), the stream response (S-RES), etc. associated with the stream command.

As described above, the storage system 120 may access and control the shared area (SA) on the host 110 by receiving the stream command from the host 110 and exchanging signals or information associated with the received stream command with the host 110. In this case, the signals or the information that are transmitted and received may have a similar structure to signals or information used in a normal operation performed according to a predetermined interface between the host 110 and the storage system 120. Since the storage system 120 can access and control the shared area (SA) on the host 110 without a separate hardware circuit or a change of an interface, a storage system and a user system having improved performance and a reduced cost may be provided.

Figure 12:
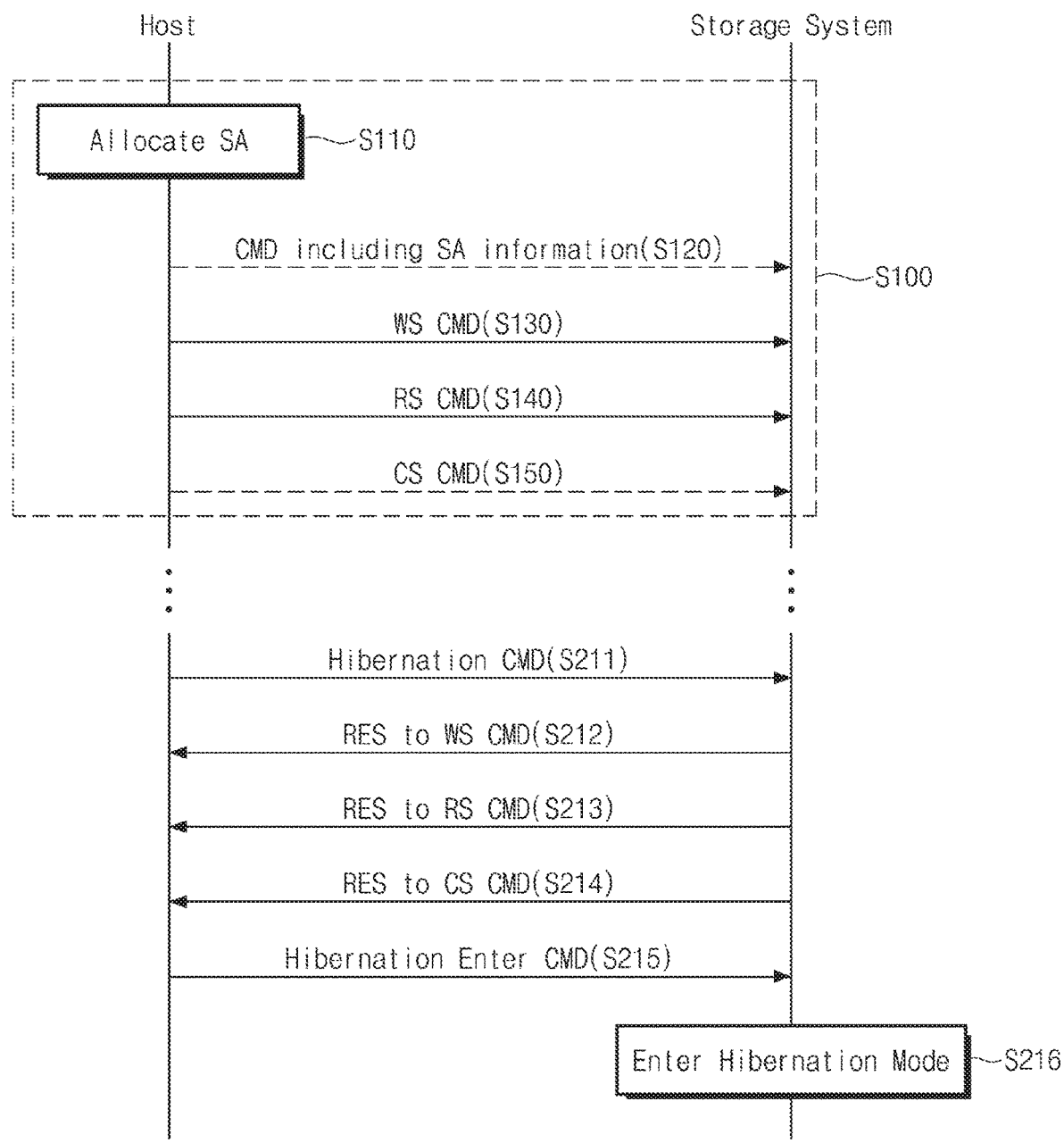
FIGS. 12 and 13 are flowcharts illustrating an operation of entering a hibernation mode of a host and a storage system in accordance with example embodiments of the disclosure.
Figure 13:
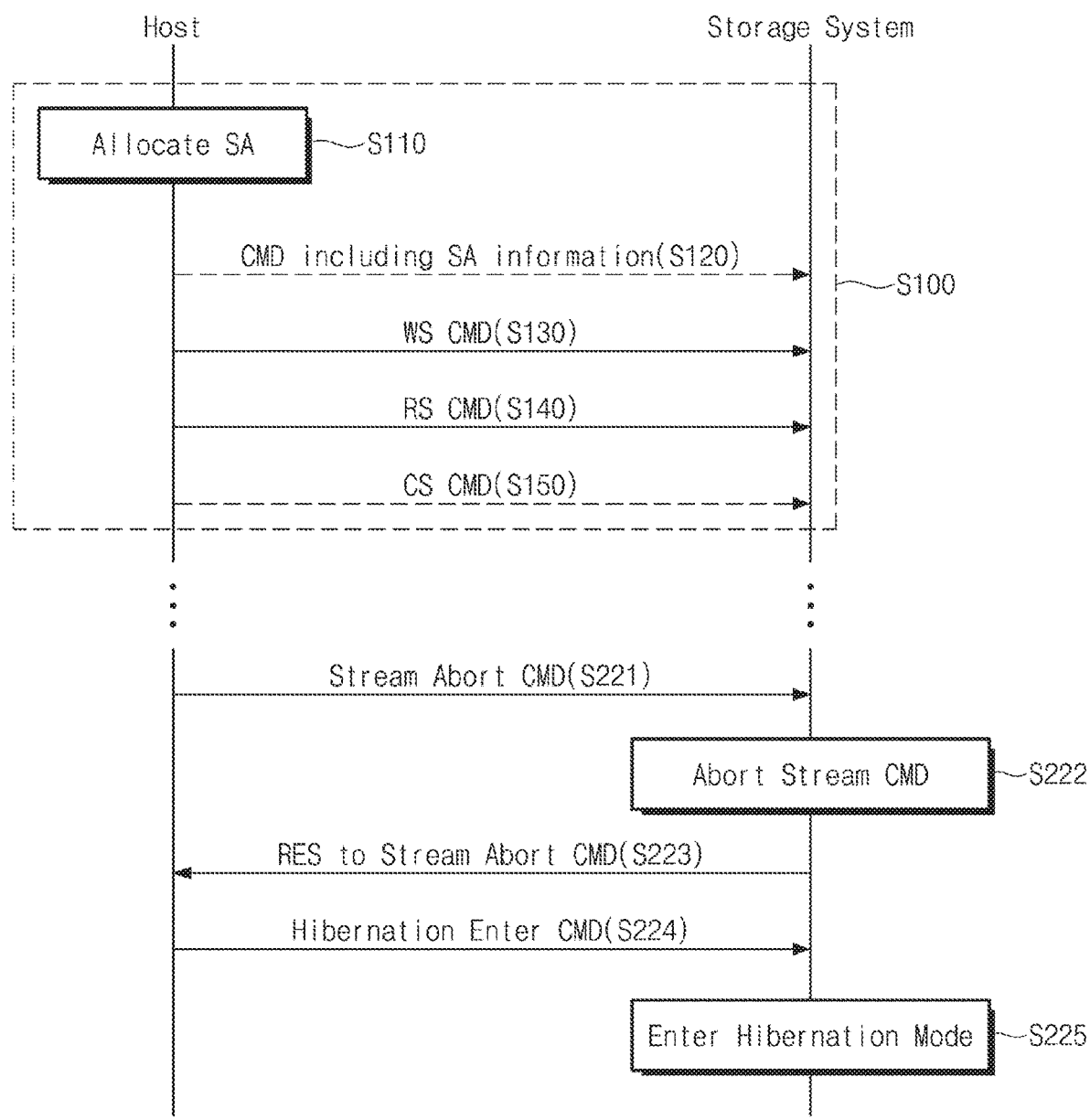

FIGS. 12 and 13 are flowcharts illustrating an operation of entering a hibernation mode of a host and a storage system in accordance with example embodiments of the disclosure.

Referring to FIGS. 1 and 12, the host 110 and the storage system 120 may perform an initialization operation (S100). An operation of S100 may include operations of S110 to S150, and since this was described with reference to FIGS. 4 and 5, a detailed description thereof is omitted.

In a specific condition (e.g., a condition in which idle time lasts for a certain period of time), the storage system 120 may enter the hibernation mode under the control of the host 110. In order for the storage system 120 to enter the hibernation mode, a command being processed between the host 110 and the storage system 120 has to be in a completion state. However, as described above, since the write stream command (WS CMD), the read stream command (RS CMD), or the control stream command (CS CMD) for a stream open is a command having no timeout, it is pending on a command queue (CQ) of the host 110 and the storage system 120. That is, in order for the storage system 120 to enter the hibernation mode, a termination process or a completion process with respect to write stream command (WS CMD), the read stream command (RS CMD), or the control stream command (CS CMD) for a stream open may be required.

Accordingly, in order for the storage system 120 to enter the hibernation mode, the host 110 and the storage system 120 may perform operations of S211 to S216.

In the operation S211, the host 110 may transmit a hibernation command to the storage system 120. The hibernation command may include information in which the host 110 notifies the storage system 120 of an entry into the hibernation mode.

In the operation S212, the storage system 120 may transmit a response with respect to the write stream command (WS CMD) to the host 110 in response to the hibernation command. This means to close a write stream opened by an operation of S130.

In the operation S213, the storage system 120 may transmit a response with respect to the read stream command (RS CMD) to the host 110 in response to the hibernation command. This means to close a read stream opened by an operation of S140.

In the operation S214, the storage system 120 may transmit a response with respect to the control stream command (CS CMD) to the host 110 in response to the hibernation command. This means to close a shared area command stream opened by an operation of S150.

The operations of S212 to S214 may performed in parallel or are not limited the operation order described above.

In the operation S215, the host 110 may transmit a hibernation entry command to the storage system after receiving all of the responses of S121 to S215. The hibernation entry command may be a signal provided by a physical layer (e.g., a UFS interconnect layer) of the host 110.

In the operation of S216, the storage system 120 may enter the hibernation mode in response to the hibernation entry command. In the hibernation mode, other constituent elements may not operate except some constituent elements (e.g., low-order physical layer) of the storage system 120.

As described above, in the case where the storage system 120 enters the hibernation mode, the storage system 120 may normally enter the hibernation mode by providing, by the host 110, an explicit command for closing opened streams to the storage system 120 and providing, by the storage system 120, responses for closing the opened streams to the host 110 in response to that.

Referring to FIGS. 1 and 13, the host 110 and the storage system 120 may perform an initialization operation (S100). An operation of S100 may include operations of S110 to S150, and since this was described with reference to FIGS. 4 and 5, a detailed description thereof is omitted.

As described above, in order for the storage system 120 to enter the hibernation mode, the host 110 and the storage system 120 may perform operations of S221 to S225.

In the operation S221, the host 110 may transmit a stream abort command to the storage system 120. The stream abort command may be a command to abort the write stream command (WS CMD), the read stream command (RS CMD), and the control stream command (CS CMD) that are pending in a command queue (CQ) of the storage system 120.

In the operation S222, the storage system 120 may abort stream commands that are pending in the command queue (CQ) in response to the stream abort command.

In the operation S223, the storage system 120 may transmit a response to the stream abort command to the host 110.

After that, the host 110 may perform operations of S224 and S225. Since the operations of S224 and S225 are similar to the operations of S215 and S216 of FIG. 12, a description thereof is omitted.

As described above, the host 110 may provide a stream abort command for aborting the stream commands that are pending in the command queue (CQ) to the storage system 120 and the storage system 120 can abort the stream commands that are pending in the command queue (CQ) in response to the stream abort command After that, the storage system 120 may notify that opened streams are all closed by providing a response to the stream abort command to the host 110.

Although not illustrated in the drawing, in the case where the hibernation mode is finished, the host 110 may provide a hibernation abort command to the storage system 120. After that, the host 110 may open the closed streams again by performing the operations of S100.

As described above, the host 110 and the storage system 120 may normally enter the hibernation mode by closing the opened streams using a specific command and a response. Thus, since the host 110 and the storage system 120 can be embodied without a separate hardware circuit or a change of an interface, a storage system having improved performance and a reduced cost may be provided.

Figure 14:
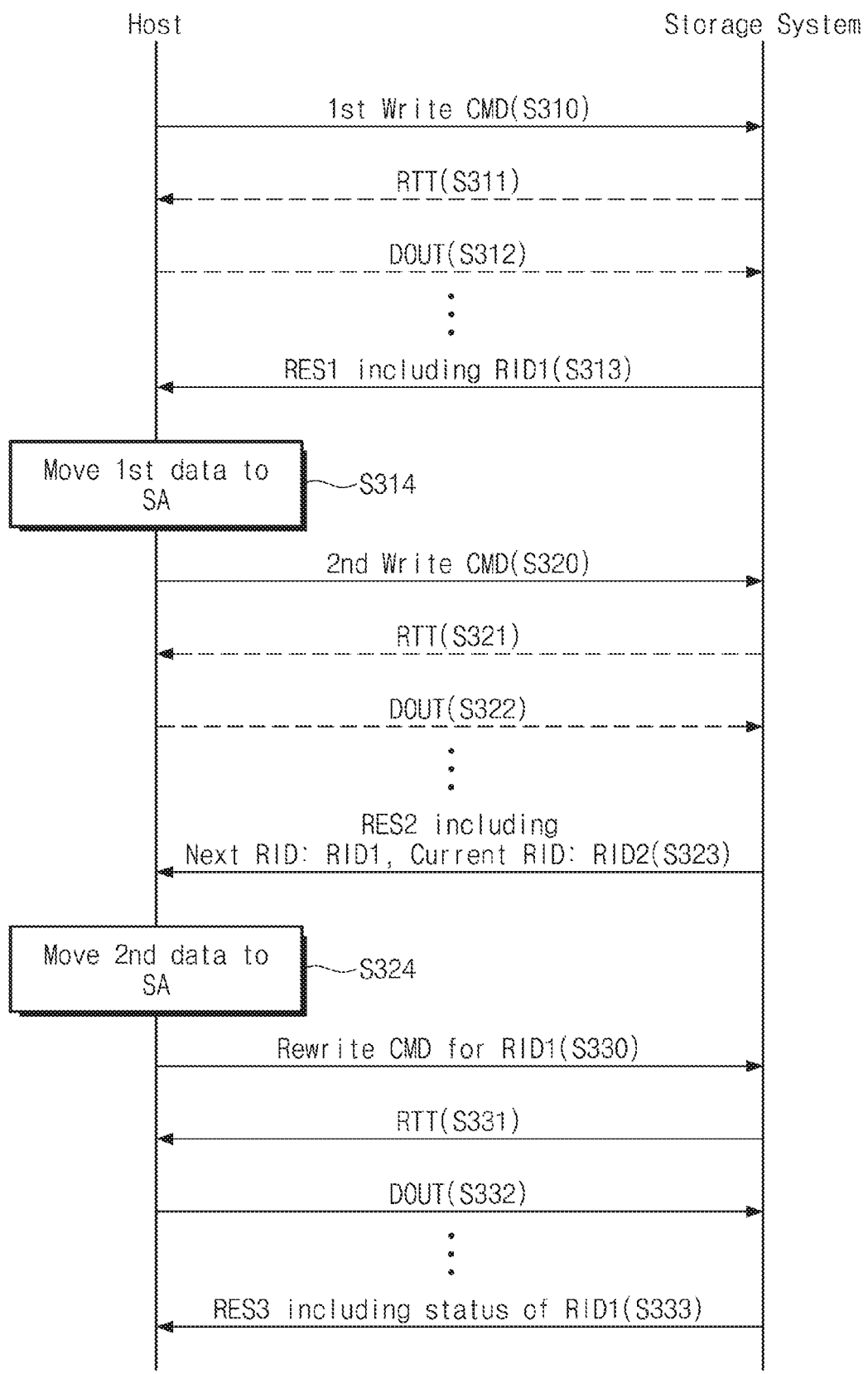
FIG. 14 is a flowchart illustrating a write operation of a host and a storage system in accordance with example embodiments of the disclosure.

FIG. 14 is a flowchart illustrating a write operation of a host and a storage system in accordance with example embodiments of the disclosure. In the description that follows, for convenience of description, it is assumed that during one write operation, write data with respect to a write command are not all transmitted to the storage system 120. After one write operation is performed, it is assumed that write data that is not transmitted exists. At this time, it is assumed that the one write operation indicates an operation from time when a write command is received to time when a response to the write command is transmitted.

Referring to FIGS. 1 and 14, in an operation of S310, the host 110 may transmit a first write command to the storage system 120. The host 110 and the storage system 120 may exchange data with each other by performing operations of S311 and S312. Since the operations of S311 and S312 are similar to the operations of S12 and S13 of FIG. 3, a description thereof is omitted. The operations of S311 and S312 may be repeatedly performed or may be omitted depending on data capacity of the data buffer 121*a* of the storage system 120, whether the nonvolatile memory device 122 is programmed, or program performance.

In an operation of S313, the storage system 120 may provide a first response (RES1) including a first rewrite ID (RID1) to the host 110. For example, the storage system 120 may provide a ready to transfer (RTT) to the host 110 according to receivable data volume of the data buffer 121*a* in response to the first write command and the host 110 may include a part of the write data in the data-out (DOUT) according to the ready to transfer (RTT) to provide the data-out (DOUT) including a part of the write data to the storage system 120.

Let's assume that the first write command is a write command indicating a write operation of data of 512 KB. In this case, due to a program speed of the nonvolatile memory device 122 and a size limit of the data buffer 121*a*, the write data of 512 KB may not be all received. In this case, the storage system 120 may give the first rewrite identifier (RID1) to the whole or part of the write data of 512 KB and may include the first rewrite identifier (RID1) in a first response (RES1) with respect to the first write command to provide the first response (RES) including the first rewrite identifier (RID1) to the host 110.

In the case where the storage system 120 cannot receive all the write data with respect to a write command, the storage system 120 may give a rewrite identifier (RID) to the data not received and may provide the first response (RES1) including the rewrite identifier (RID) to the host 110. The first response (RES1) may have a similar structure to the response (RES) with respect to the write command described with reference to FIG. 3. The first rewrite identifier (RID1) may be included in a reserved area or a reserved field of the first response (RES1) or in a sense data area.

In an operation of S314, the host 110 can move first data to the shared area (SA) in response to the received first response (RES1). The first data may indicate the entirety of write data with respect to the first write command or some write data that is not transmitted to the storage system 120. The host 110 may manage the first data with reference to the first rewrite identifier (RID1). The movement of the first data may be logically performed through a method such as a buffer address swap, an offset change, etc.

In the case where the whole write data with respect to the first write command is transmitted to the storage system 120, the first rewrite identifier (RID1) is not given and the operation of the S314 may be omitted.

In an operation S320, the host 110 may transmit a second write command to the storage system 120.

The host 110 and the storage system 120 may perform operations of S321 and S322. Since the operations of the S321 and the S322 are similar to the operations of the S12 and the S13, a detailed description thereof is omitted.

In an operation of S323, the storage system 120 may transmit a second response (RES2) including the first rewrite identifier (RID1) as a next rewrite identifier and a second rewrite identifier (RID2) as a current rewrite identifier to the host 110. For example, first write data to which the first rewrite identifier (RID1) is given may be stored in the shared area (SA) of the host 110. The storage system 120 may include the first rewrite identifier (RID1) as a next rewrite identifier in the second response (RES2) to receive the first write data stored in the shared area (SA) of the host 110. The response of the operation S323 may further include information such as a buffer address, a buffer offset, or a buffer length with respect to the first data.

In the case where the storage system 120 does not receive the whole write data with respect to the second write command similar to that described with reference to the operation S313, the storage system 120 may give the second rewrite identifier (RID2) to the remaining write data among the write data with respect to the second write command. The second rewrite identifier (RID2) may be included in the second response (RES2) as a current rewrite identifier.

In an operation S324, the host 110 may move second data to the shared area (SA) in response to the response of the operation S323 and may manage the second data which was moved to the shared area (SA) with reference to the second rewrite identifier (RID2). Similar to the operation S314, in the case where the whole write data with respect to the second write command is transmitted to the storage system 120, the second rewrite identifier (RID2) is not given and the operation of the S324 is omitted.

In an operation S330, the host 110 may transmit a rewrite command with respect to the first data to the storage system 120 in response to the second response (RES2) (in particular, the first rewrite identifier (RID1) set as a next rewrite identifier).

Thereafter, the host 110 and the storage system 120 may perform operations of S331 and S332. Since the operations of the S331 and the S332 are similar to the operations of the S12 and the S13 of FIG. 3, a detailed description thereof is omitted.

In the operation S333, the storage system 120 may provide a third response (RES3) including state information of the first rewrite identifier (RID1) to the host 110. The whole first data of the shared area (SA) may be transmitted to the storage system 120 by repeatedly performing, by the host 110 and the storage system 120, the operations of S330 to S332 more than once. In this case, since the whole first data is stored in the storage system 120, the first data of the shared area (SA) doesn't need to be maintained.

In contrast, only some data of the first data may be transmitted to the storage system 120 by repeatedly performing, by the host 110 and the storage system 120, the operations of S330 to S332 more than once. In this case, since among the first data, data which is not transmitted to the storage system 120 has to be transmitted to the storage system 120 again through a next write operation, the data has to be maintained in the shared area (SA).

As described above, state information about whether first data corresponding to the first rewrite identifier (RID1) is all transmitted to the storage system 120 or whether data that is not transmitted exits may be provided to the host 110. The host 110 can release the first data from the shared area (SA) or maintain the first data and information (e.g., a rewrite identifier, a first data buffer address, a buffer offset, etc.) corresponding to the first data on the basis of the received state information.

As described above, in the case where the storage system 120 cannot receive the whole write data with respect to the write command depending on accommodative capacity of data of the data buffer 121a or program performance of the nonvolatile memory device 122, the storage system 120 may perform a write operation with respect to the remaining data by giving a rewrite identifier (RID) with respect to the write command not received and requesting a response of other commands for a rewrite operation with respect to the rewrite identifier (RID). Thus, a storage system having improved performance is provided.

Figure 15:
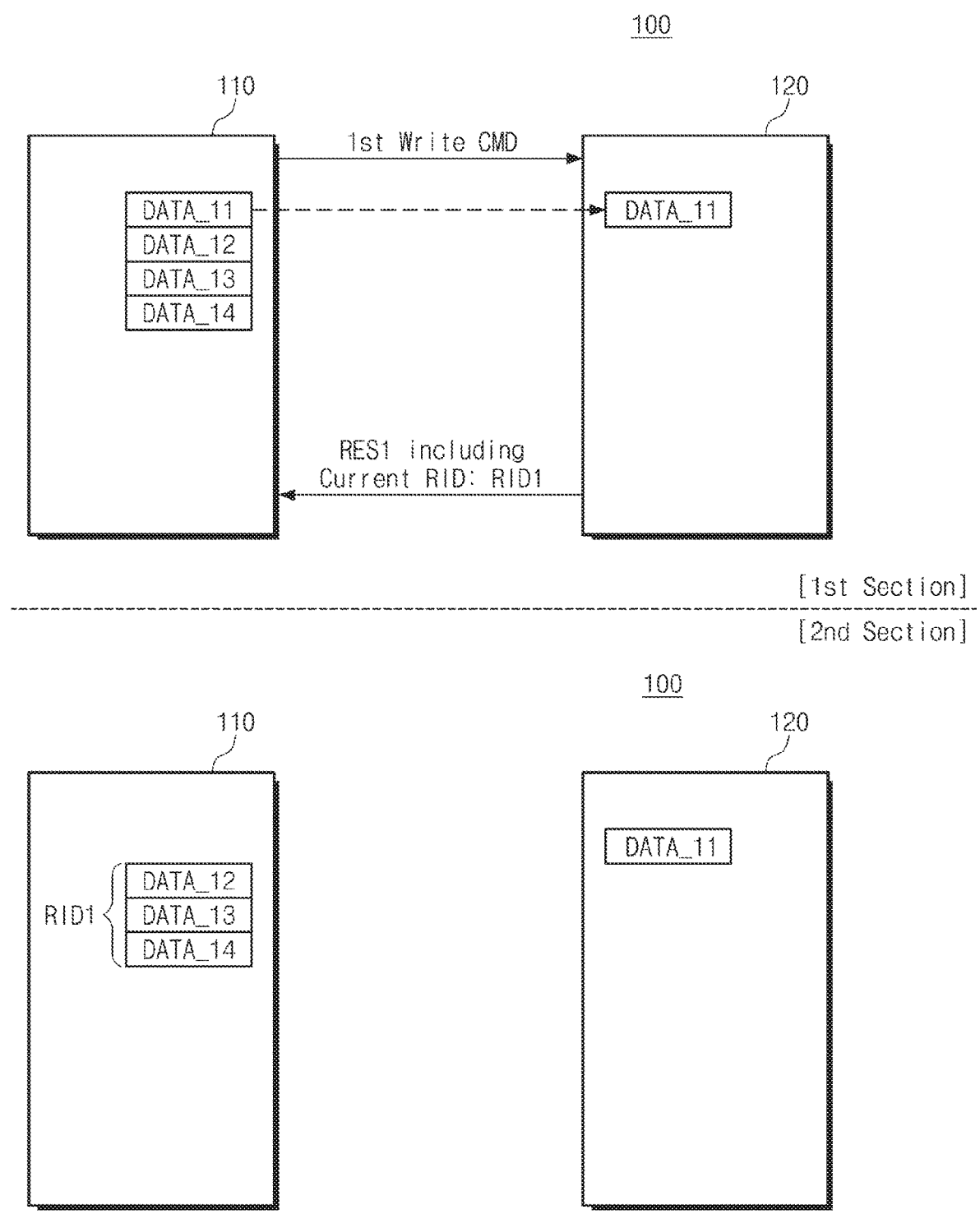
FIGS. 15 and 16 are views for explaining an operation of FIG. 14.
Figure 16:
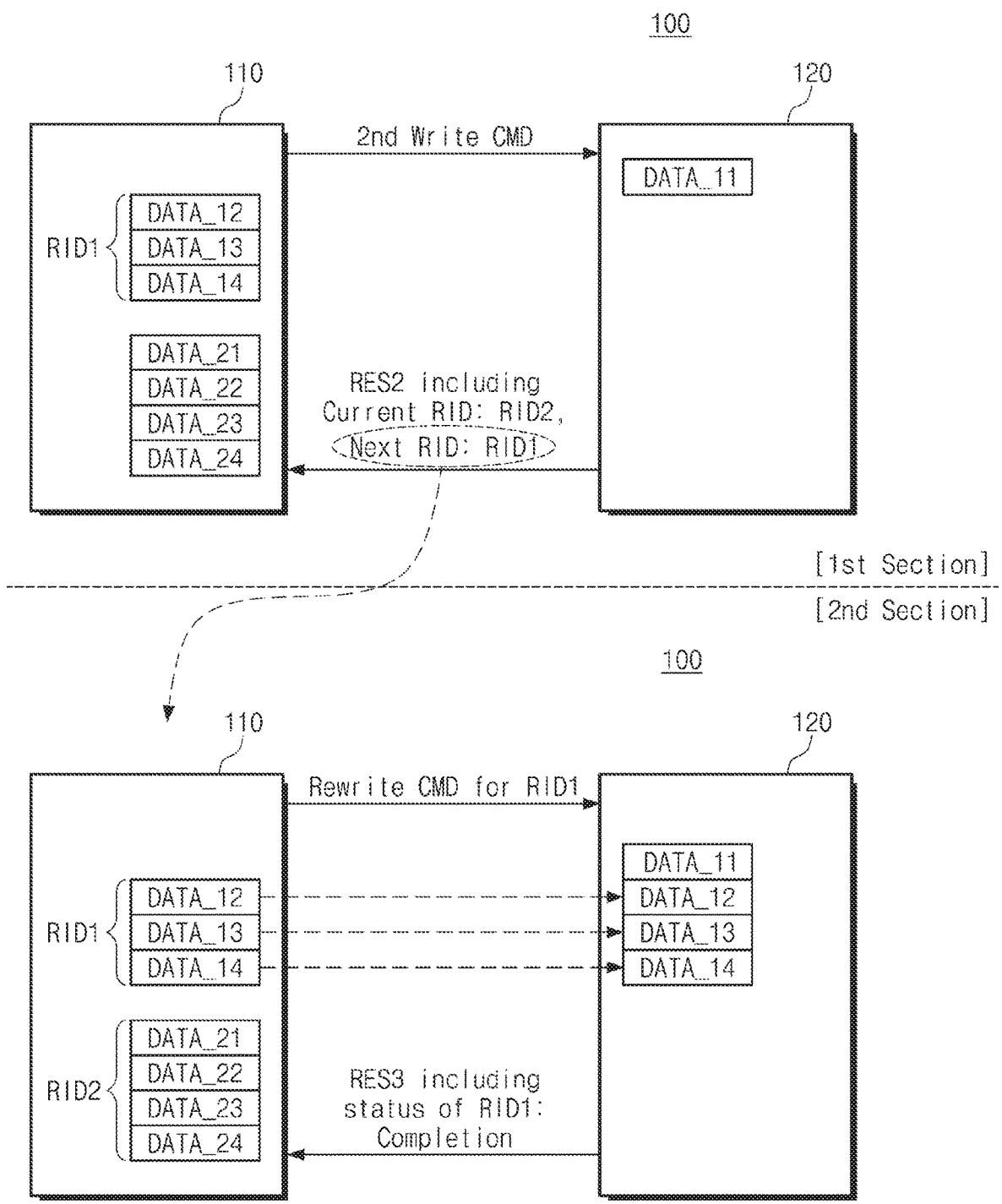

FIGS. 15 and 16 are views for explaining an operation of FIG. 14. For brevity of description, constituent elements unnecessary for describing the operation of FIG. 14 are omitted. In FIGS. 15 and 16, data on the host 110 means that it is stored in the RAM 111 of the host 110 and data on the storage system 120 means that it is stored in the data buffer 121a or the nonvolatile memory device 122. In FIGS. 15 and 16, there is illustrated that data is directly transmitted from the host 110 to the storage system 120. However, this is only for brevity of views, and the host 110 and the storage system 120 may exchange a ready to transfer (RTT) and a data-out (DOUT) with each other according to a predetermined interface.

It is assumed that write data with respect to a write command includes 4 data units. The data unit may indicate a data unit defined by the host 110. However, the disclosure is not limited thereto.

In the description that follows, there is described that a rewrite identifier is given to write data with respect to a write command. However, the disclosure is not limited thereto. For example, a rewrite identifier may be given in units of write data units.

Referring to FIGS. 1, 14 and 16, the user system 100 may include the host 110 and the storage system 120. As illustrated in a first section of FIG. 15, the host 110 can transmit a first write command for storing first data (DATA_11 to DATA_14) in the storage system 120 to the storage system 120 (S310).

The host 110 may transmit the data unit (DATA_11) among the first data (DATA_11 to DATA_14) to the storage system 120 in response to a ready to transfer (RTT) of the storage system 120 (refer to the S311 and the S312 of FIG. 14).

After that, the storage system 120 may give the first rewrite identifier (RID1) to the remaining data units (DATA_12 to DATA_14) and may transmit a first response including the first rewrite identifier (RID1) as the current identifier to the host 110. In the case where there is no storable capacity in the data buffer 121a of the storage buffer 120 due to a program speed of the nonvolatile memory device 122, the rewrite identifier may be given.

As illustrated in a second section of FIG. 15, the host 110 can manage the remaining data units (DATA_12 to DATA_14) based on the first rewrite identifier (RID1) in response to the received first response (in particular, the first rewrite identifier (RID1)). The remaining data units (DATA_12 to DATA_14) may be moved to the shared area (SA).

As illustrated in a first section of FIG. 16, the host 110 may transmit a second write command for storing second data (DATA_21 to DATA_24) in the storage system 120 to the storage system 120.

In the case where the nonvolatile memory device 122 (refer to FIG. 1) of the storage system 120 is being programmed and there is no receivable storage space in the data buffer 121a, the storage system 120 does not receive the second data (DATA_21 to DATA_24) and may transmit a second response (RES2) with respect to the second write command to the host 110. In this case, the second response (RES2) may include information of the second rewrite identifier (RID2) as a current rewrite identifier and the first rewrite identifier (RID1) as a next rewrite identifier. The current rewrite identifier indicates a rewrite identifier given to the remaining data units among the second data corresponding to the write command (i.e., the second write command) being processed.

The storage system 120 may further include buffer offset information of data units corresponding to the first rewrite identifier (RID1) in the second response (RES2). That is, the storage system 120 may determine a size of data that the storage system 120 likes to receive in a rewrite operation.

As illustrated in a second section of FIG. 16, the host 110 can manage the remaining data units (DATA_21 to DATA_24) based on the second rewrite identifier (RID2) in response to the received second response (RES2).

The host 110 may perform a rewrite operation with respect to the data units (DATA_12 to DATA_14) corresponding to the first rewrite identifier (RID1) set as a next rewrite identifier in response to the received second response (RES2).

The host 110 may transmit a rewrite command with respect to the first rewrite identifier (RID1) to the storage system 120 to perform a rewrite operation. After that, the data units (DATA_12 to DATA_14) corresponding to the first rewrite identifier (RID1) may be transmitted to the storage system 120 by repeatedly performing, by the host 110 and the storage system 120, the operations of S331 and S332 of FIG. 14.

After that, the storage system 120 may transmit a third response (RES3) including state information of the first rewrite identifier (RID1) to the host 110. As illustrated in the second section of FIG. 16, in the case where data units corresponding to the first rewrite identifier (RID1) are all received to the storage system 120, it is considered that the data units corresponding to the first rewrite identifier (RID1) are all stored in the storage system 120. In this case, the state information of the first rewrite identifier (RID1) is set as completion and information about the data units corresponding to the first rewrite identifier (RID1) on the host 110 may be released.

Although not illustrated in the drawing, in the case where the data units corresponding to the first rewrite identifier (RID1) are not all transmitted to the storage system 120 (i.e., in the case where data units that are not transmitted exist), the state information of the first rewrite identifier (RID1) is set as incompletion and the host 110 maintains information about the data units that are not transmitted.

As described above, the storage system 120 may request the host 110 for a rewrite operation by giving a rewrite identifier to the data units that are not transmitted and including rewrite identifier information given to a response of other commands Thus, write performance of the storage system 120 is improved without an increase of the data buffer 121a or a change of an interface of the storage system 120.

Information such as the rewrite identifier or the state information of the rewrite identifier may be stored in a reserved area or a separate area of a response according to a predetermined interface between the host 110 and the storage system 120. A table 1 shows information included in a response (RES).

TABLE 1

| Field name | | Field size | comment |
|---|---|---|---|
| Current CMD | RewriteState | 1 bit | 0: a current command is not used in a next rewrite operation. 1: a current command is used in a next rewrite operation. |
| | RewriteTaskID | 15 bit | In the case where a currentCMDRewriteState is '1', it is valid. |
| Next CMD | RewriteState | 1 bit | 0: a next CMD is not allocated. 1: a rewrite command is issued as a next CMD in a host. |
| | RewriteTaskID | 15 bit | In the case where a NextCMDRewriteState is '1', it is valid. |
| | BufferOffset | 32 bit | A buffer offset of a next rewrite command |
| | BufferLength | 8 bit | A buffer length of a next rewrite command |

Referring to the table 1, the embodiments of the disclosure described with reference to FIGS. 14 through 16 may be implemented by including the information of the table 1 in a response (RES) with respect to a command from the host 110. In the case where write data with respect to the first write command is not all received, a field of the "CurrentCMDRewriteState" may be set to "1" and a rewrite identifier (RID) may be set in a field of a "CurrentCMDRewriteTaskID". In the case where a rewrite operation is required, a field of the "NextCMDRewriteState" may be set to "1", a field of a "NextCMDRewriteTaskID" may be set to a rewrite identifier which becomes a write target again, and a rewrite operation may be requested to the host 110 by setting buffer information in fields of a "NextCMDBufferOffset" and a "NextCMDBufferLength". The field and the constitution illustrated in the table 1 are only an illustration for describing embodiments of the disclosure and the disclosure is not limited thereto.

A rewrite command issued from the host 110 may include information such as a table 2.

TABLE 2

| Field name | Field size | comment |
|---|---|---|
| ReWriteTaskID | 15 bit | A given rewrite identifier |
| Flush | 1 bit | 1: a rewrite operation by a flush request of a host 0: a rewrite operation by a request of a storage system |

Referring to FIG. 2, a rewrite command may include a rewrite identifier (RID) and flush information that are given by the storage system 120. As illustrated in FIG. 16, the host 110 may transmit the rewrite command to the storage system 120 in response to a second response in which a next rewrite identifier is set. In this case, the rewrite command may include the next rewrite identifier included in the second response.

The rewrite operation may be performed by not only a request of the storage system 120 but also a flush request of an operating system in the host 110. In this case, the host 110 may notify that the rewrite command is a rewrite command by a flush request by setting a value of "Flush" field of the rewrite command to "1".

The field and the constitution illustrated in the table 2 are only an illustration for describing embodiments of the disclosure and the disclosure is not limited thereto.

Figure 17:
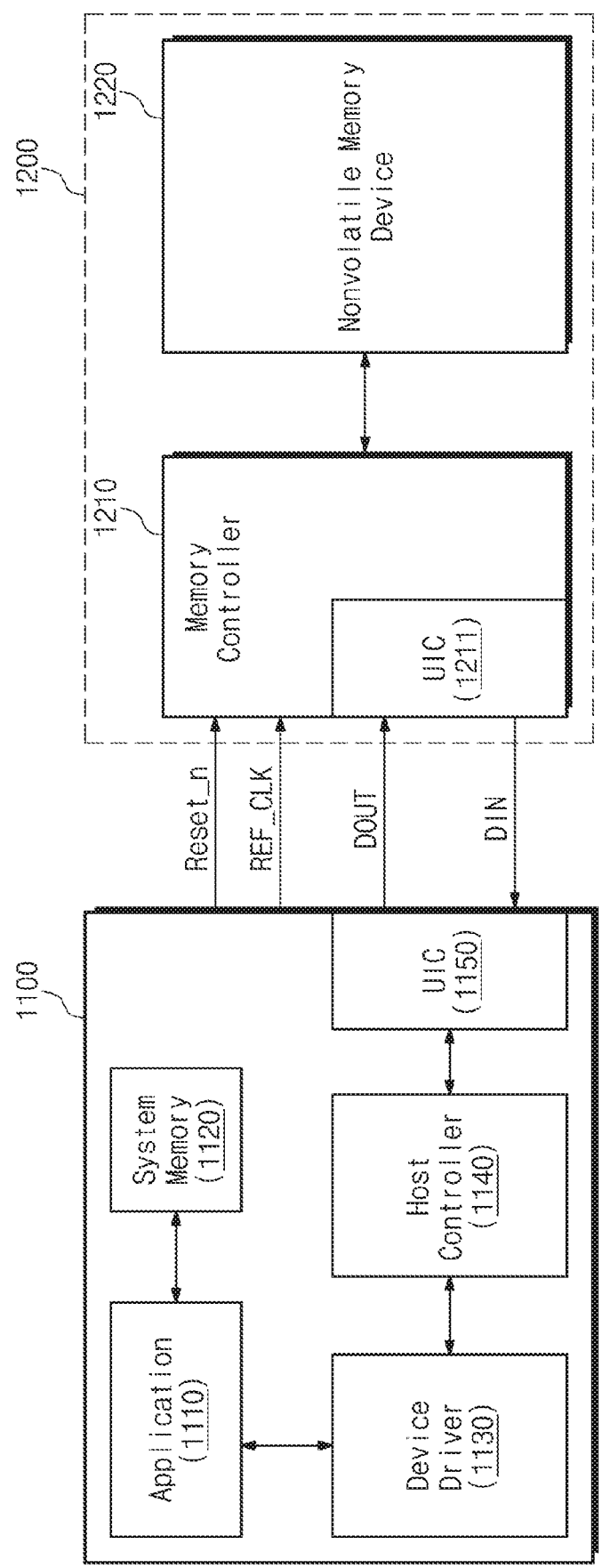
FIG. 17 is a block diagram illustrating a user system according to the disclosure.

FIG. 17 is a block diagram illustrating a user system according to the disclosure. Referring to FIG. 17, a user system may include a host 1100 and a storage system 1200.

The host 1100 may include an application 1110, a system memory 1120, a device driver 1130, a host controller 1140, and a UFS interconnect layer 1150.

The application 1110 may include an operating system (OS) and various application programs that are driven in the host 1100.

The system memory 1120 may be used as a buffer memory, a cache memory, or a main memory of the host 1100. The system memory 1120 may be a high speed random access memory such as an SDRAM, an SRAM, a DRAM, a PRAM, an ReRAM, an MRAM, an FRAM, a TRAM, etc. The system memory 1120 may be the RAM 111 described with reference to FIGS. 1 through 16 and may include a user area (UA) and a shared area (SA). The system memory 1120 may be accessed or controlled by the storage system 1200 through the method described with reference to FIGS. 1 through 16.

The device driver 1130 may be a program that performs an operation of converting input/output commands from an application of the host 1100 into a message corresponding to the storage system 1200.

The host controller 1140 may be a hardware circuit that generates various signals for controlling the storage system 1200 under the control of the device driver 1130.

The UFS interconnect layer 1150 may be a physical layer for providing signals from the host controller 1140 to the storage system 1200. The UFS interconnect layer 1150 may include physical layers such as UniPro, M-Phy, etc.

The storage system 1200 may include a memory controller 1210 and a nonvolatile memory device 1220. The storage system 1200 may be provided to a USF card or an embedded UFS device.

The memory controller 1210 may receive a reset signal (Reset_n) for a hardware reset and a reference clock (REF_CLK) from the host 1100. The memory controller 1210 may include a UFS interconnect layer 1211 of the same kind as the UFS interconnect layer 1150 included in the host 1100. The UFS interconnect layer 1150 of the host 1100 and the UFS interconnect layer 1211 of the storage system 1200 may exchange data-in (DIN) and data-out (DOUT) with each other. The data-in (DIN) and the data-out (DOUT) may be provided in the form of a signal defined by a predetermined interface between the host 1100 and the storage system 1200. The data-in (DIN) and the data-out (DOUT) may include signals such as the commands, the data-in, the data-out, the ready to transfer, and the response that are described with reference to FIGS. 1 through 16.

The host 1100 and the storage system 1200 may operate based on the operation method described with reference to FIGS. 1 through 16. That is, the storage system 1200 may access the system memory 1120 based on the operation method described with reference to FIGS. 1 through 16.

Figure 18:
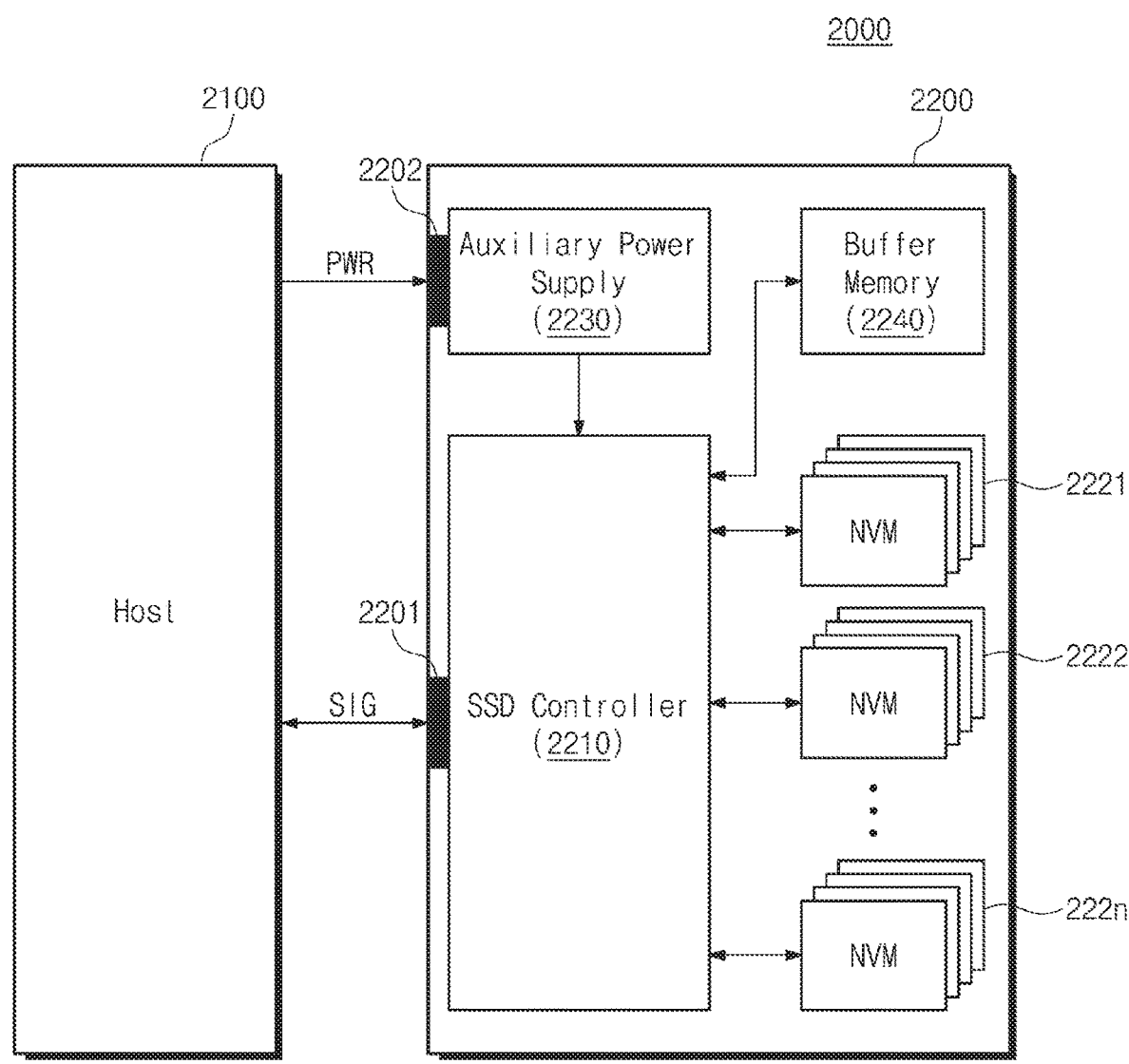
FIG. 18 is a block diagram illustrating a solid state drive (SSD) to which the disclosure is applied.

FIG. 18 is a block diagram illustrating a solid state drive (SSD) to which the disclosure is applied. Referring to FIG. 18, the SSD system 2000 may include a host 2100 and an SSD 2200.

The SSD 2200 may exchange a signal SIG with the host 2100 through a signal connector 2201 and may receive power PWR through a power connector 2202. The signal SIG may include information such as the commands, the data-in, the data-out, the ready to transfer, and the response that are described with reference to FIGS. 1 through 16. The SSD 2200 includes an SSD controller 2210, a plurality of flash memories (2221 to 222*n*), an auxiliary power supply device 2230, and a buffer memory 2240.

The SSD controller 2210 may control the plurality of flash memories (2221 to 222*n*) in response to the signal SIG received from the host 2100. The plurality of flash memories (2221 to 222*n*) may operate under the control of the SSD controller 2210. The SSD controller 2210 can access a system memory (not illustrated) included in the host 2100 according to the method described with reference to FIGS. 1 through 16.

The auxiliary power supply device 2230 is connected to the host 2100 through the power connector 2202. The auxiliary power supply device 2230 may receive power from the host 2100 to be charged. In the case where power is not smoothly supplied from the host 2100, the auxiliary power device 2230 may supply power of the SSD 2200.

The buffer memory 2240 operates as a buffer memory. The buffer memory 2240 may temporarily store data received from the host 2100, data received from the plurality of flash memories (2221 to 222*n*), or meta data (e.g., mapping table) of the flash memories (2221 to 222*n*). The buffer memory 2240 may temporarily store various information required when the SSD controller 2210 operates.

The storage system according to example embodiments of the disclosure may access a shared memory in a host or may provide control information for controlling the shared memory to the host without adding hardware. Thus, according to example embodiments of the disclosure, a method of operating a storage system and a host that have improved performance and a reduced cost is provided.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The contents described above are specific embodiments for implementing the disclosure. The disclosure may include not only the embodiments described above but also embodiments in which a design is simply or easily capable of being changed. The disclosure may also include technologies easily changed to be implemented using the aforementioned embodiments. Thus, the scope of the disclosure is to be determined by the following claims and their equivalents, and shall not be restricted or limited by the embodiments described above.

What is claimed is:

1. An operation method executed by a storage device that communicates with an external host, the method comprising:
   receiving, from the external host, a command including information about a system memory placed in the external host;
   receiving, from the external host, a write stream command and a read stream command, each of the write stream command and the read stream command corresponding to an infinite timeout;
   receiving, from the external host, a read command corresponding to a first predetermined timeout, and then performing, in response to the read command, a read operation corresponding to the read command, and then transmitting a data-in packet including first data read by the read operation to the external host within the first predetermined timeout;
   writing second data in the system memory placed in the external host by transmitting a stream data-in packet including the second data to the external host, the stream data-in packet corresponding to the write stream command; and
   reading third data from the system memory placed in the external host by transmitting a stream ready to transfer packet to the external host in response to the read stream command, and then receiving a stream data-out packet including the third data from the external host, the stream ready to transfer packet corresponding to the read stream command, the stream data-out packet corresponding to the stream ready to transfer packet,
   wherein each of the write stream command, the read stream command, the read command, the data-in packet, the stream data-in packet, and the stream data-out packet is a universal flash storage protocol information unit (UPIU) defined by a universal flash storage (UFS) specification.

2. The operation method of claim 1, wherein the stream data-in packet further comprises buffer offset information about an area of the system memory in which the second data is to be written.

3. The operation method of claim 1, wherein:
the stream ready to transfer packet comprises information about a buffer offset and a buffer length with respect to third data stored in the system memory.

4. The operation method of claim 1, further comprises:
receiving, from the external host, a control stream command corresponding to the infinite timeout; and
controlling the system memory by transmitting a stream response packet including control information for controlling the system memory, the stream response packet corresponding to the control stream command.

5. The operation method of claim 4, wherein the control information corresponds to at least one of operations of copying, moving, and swapping data stored in the system memory and an operation of deleting data stored in the system memory.

6. The operation method of claim 1, further comprising:
receiving, from the external host, a control stream command corresponding to the infinite timeout;
changing a command identifier with respect to the stream control command; and
controlling the system memory by transmitting an additional stream data-in packet including the changed command identifier and control information for controlling the system memory, the additional stream data-in packet corresponding to the control stream command.

7. The operation method of claim 1, further comprising:
receiving an additional write stream command and an additional read stream command from the external host;
receiving a hibernation command from the external host;
transmitting a first response associated with the additional write stream command and a second response associated with the additional read stream command to the external host in response to the received hibernation command;
receiving a hibernation entry command from the external host; and
entering a hibernation mode in response to the received hibernation entry command.

8. The operation method of claim 1, further comprising:
receiving an additional write stream command and an additional read stream command from the external host;
receiving a stream abort command from the external host;
terminating the additional write stream command and the additional read stream command in response to the received stream abort command;
transmitting a response to the stream abort command to the external host;
receiving a hibernation entry command from the external host; and
entering a hibernation mode in response to the received hibernation entry command.

9. An operation method executed by a host including a system memory, the method comprising:
allocating a portion of the system memory as a shared memory for sharing with an external storage system;
transmitting a command including information about the shared memory to the external storage system;
transmitting a write stream command and a read stream command to the external storage system, each of the stream write command and the read stream command corresponding to an infinite timeout;
reading first data from the external storage system by transmitting a read command corresponding to a predetermined timeout to the external storage system, and then receiving a data-in packet including the first data within the predetermined timeout;
receiving a stream data-in packet associated with the stream write command from the external storage system, the stream data-in packet including second data;
storing the second data in the portion of the system memory allocated as the shared memory in response to the stream data-in packet;
receiving a stream ready to transfer packet associated with the read stream command from the external storage system,
reading third data from the portion of the system memory allocated as the shared memory in response to the stream ready to transfer packet; and
transmitting a stream data-out packet including the third data to the external storage system,
wherein each of the write stream command, the read stream command, the read command, the data-in packet, the stream data-in packet, and the stream data-out packet is a universal flash storage protocol information unit (UPIU) defined by a universal flash storage (UFS) specification.

10. The operation method of claim 9, wherein:
the stream data-in packet further comprises buffer offset information about an area of the shared memory in which the second data is to be written.

11. The operation method of claim 9, wherein:
the stream ready to transfer packet comprises buffer offset information about an area of the shared memory in which the third data is stored.

12. The operation method of claim 9, further comprises:
transmitting an additional write stream command and an additional read stream command to the external storage system;
transmitting a hibernation command to the external storage system;
receiving a first response associated with the additional write stream command and a second response associated with the additional read stream command from the external storage system; and
transmitting a hibernation entry command to the external storage system in response to the first response and the second response.

13. The operation method of claim 9, further comprising:
transmitting an additional write stream command and an additional read stream command to the external storage system;
transmitting a stream abort command to the external storage system device;
receiving a response associated with the stream abort command from the external storage system; and
transmitting a hibernation entry command to the external storage system in response to the response associated with the stream abort command.

* * * * *